(12) United States Patent
Domine et al.

(10) Patent No.: US 10,876,049 B2
(45) Date of Patent: Dec. 29, 2020

(54) METHOD FOR RECOVERING THE OXYGENATED COMPOUNDS CONTAINED IN AQUEOUS FRACTIONS DERIVED FROM BIOMASS

(71) Applicants: CONSEJO SUPERIOR DE INVESTIGACIONES CIENTIFICAS (CSIC), Madrid (ES); UNIVERSITAT POLITECNICA DE VALENCIA, Valencia (ES)

(72) Inventors: Marcelo Eduardo Domine, Valencia (ES); Jose Manuel Lopez Nieto, Valencia (ES); Daniel Delgado Munoz, Valencia (ES); Alberto Fernandez-Arroyo Naranjo, Valencia (ES)

(73) Assignees: CONSEJO SUPERIOR DE INVESTIGACIONES CIENTIFICAS (CSIC), Madrid (ES); UNIVERSITAT POLITECNICA DE VALENCIA, Valencia (ES)

( * ) Notice: Subject to any disclaimer, the term of this patent is extended or adjusted under 35 U.S.C. 154(b) by 179 days.

(21) Appl. No.: 16/087,803

(22) PCT Filed: Mar. 22, 2017

(86) PCT No.: PCT/ES2017/070167
§ 371 (c)(1),
(2) Date: Mar. 27, 2019

(87) PCT Pub. No.: WO2017/162900
PCT Pub. Date: Sep. 28, 2017

(65) Prior Publication Data
US 2019/0367816 A1 Dec. 5, 2019

(30) Foreign Application Priority Data
Mar. 22, 2016 (ES) .................. 201630339

(51) Int. Cl.
*C10G 3/00* (2006.01)
*B01J 23/10* (2006.01)
(Continued)

(52) U.S. Cl.
CPC .............. *C10G 3/44* (2013.01); *B01J 23/10* (2013.01); *B01J 23/20* (2013.01); *B01J 23/30* (2013.01);
(Continued)

(58) Field of Classification Search
CPC ..................... B01J 2523/00; B01J 2523/56; B01J 2523/69; B01J 2523/13; B01J 2523/3712;
(Continued)

(56) References Cited

U.S. PATENT DOCUMENTS

| 2012/0222349 A1* | 9/2012 | Truitt ............... C10G 3/47 44/349 |
| 2013/0079566 A1 | 3/2013 | Lin |

(Continued)

FOREIGN PATENT DOCUMENTS

| CN | 101870881 A | 10/2010 |
| EP | 2631224 A2 | 8/2013 |

OTHER PUBLICATIONS

Yue et al., "Acid catalytic properties of reduced tungsten and niobium-tungsten oxides", ELSEVIER Science Direct, vol. 163, Feb. 2015, pp. 370-381, 12 pages.

(Continued)

*Primary Examiner* — Sharon Pregler
(74) *Attorney, Agent, or Firm* — Hayes Soloway PC

(57) ABSTRACT

The present invention relates to a method for producing mixtures of hydrocarbons and aromatic compounds for subsequent use as fuel components (preferably in the C5-C16 range) by catalytic conversion of the oxygenated compounds contained in aqueous fractions derived from (Continued)

primary biomass treatments, which can comprise at least the following steps: (i) bringing the aqueous mixture containing the oxygenated compounds derived from biomass in contact with a catalyst comprising at least W and/or Nb, and combinations of Nb and W with other elements, (ii) reacting the mixture with the catalyst in a catalytic reactor at temperatures between 50° C. and 450° C. and under pressures of 1 to 120 bar; and (iii) recovering the products obtained by a liquid/liquid separation process of the aqueous and organic phases.

26 Claims, 20 Drawing Sheets

(51) Int. Cl.
    *B01J 23/20*     (2006.01)
    *B01J 23/30*     (2006.01)

(52) U.S. Cl.
    CPC .. *C10G 2300/1011* (2013.01); *C10G 2300/70* (2013.01); *C10G 2400/30* (2013.01)

(58) Field of Classification Search
    CPC ...... B01J 2523/55; B01J 23/002; B01J 23/10; B01J 23/20; B01J 23/30; B01J 23/8474; B01J 23/888; B01J 35/002; B01J 37/0236; B01J 37/03; B01J 37/10; C10G 2300/1011; C10G 2300/70; C10G 2400/30; C10G 3/44; Y02P 30/20; C07C 29/132; C07C 51/21; C07C 31/12; C07C 31/125; C07C 31/20; C07C 59/185; C07C 1/20; C07C 27/04; C07C 29/60; C07C 41/09; C07C 45/59; C07C 45/60; C07C 4/02; C07C 51/377; C07C 5/10; C07C 1/24
See application file for complete search history.

(56) References Cited

U.S. PATENT DOCUMENTS

2014/0273118 A1*   9/2014   Held .................... C10G 3/47
                                                                                     435/136
2014/0288338 A1   9/2014   Radlein et al.

OTHER PUBLICATIONS

Asadieraghi et al., "Model compoundapproachtodesignprocessandselectcatalysts for in-situ bio-oil upgrading", ELSEVIER Science Direct, vol. 36(C), pp. 286-303, 18 pages.

Huber, et al., "Synthesis of Transportation Fuels from Biomass: Chemistry, Catalysts, and Engineering", American Chemical Reviews, vol. 106, 2006, pp. 4044-4098, 55 pages.

Cherubini et al., "Toward a common classification approach for biorefinery systems", Biofpr, vol. 3, Issue 5, Oct. 2009, pp. 534-546, 13 pages.

Gaertner et al., "Catalytic coupling of carboxylic acids by ketonization as a processing step in biomass conversion", ELSEVIER Science Direct, Journal of Catalysis, vol. 266, 2009, pp. 71-78, 8 pages.

Gangadharan et al., "Condensation reactions of propanal over $CexZr1—xO_2$ mixed oxide catalysts", ELSEVIER Science Direct, Applied Catalysis A: General, vol. 385, 2010, pp. 80-91, 12 pages.

Iojoiu et al., "Hydrogen production by sequential cracking of biomass-derived pyrolysis oil over noble metal catalysts supported on ceria-zirconia", ELSEVIER Science Direct, Applied Catalysis A: General, vol. 323, 2007, pp. 147-161, 15 pages.

Serrano-Ruiz et al., "Effect of the support composition on the vapor-phase hydrogenation of crotonaldehyde over $Pt/CexZr1—xO_2$ catalysts", ELSEVIER Science Direct, Journal of Catalysis, vol. 241, 2006, pp. 45-50, 11 pages.

Stosic et al., "$CeO_2—Nb_2O_5$ mixed oxide catalysts: Preparation, characterization and catalytic activity in fructose lehydration reaction", ELSEVIER Science Direct, Catalysis Today, vol. 192, 2012, pp. 160-168, 9 pages.

Thibodeau et al., "Composition of tungsten oxide bronzes active for hydrodeoxygenation", ELSEVIER Science Direct, Applied Catalysis A: General, vol. 388, 2010, pp. 86-95, 10 pages.

\* cited by examiner

METHOD FOR RECOVERING THE OXYGENATED COMPOUNDS CONTAINED IN AQUEOUS FRACTIONS DERIVED FROM BIOMASS

FIELD OF THE INVENTION

This invention pertains to the field of synthesis and application of catalysts for the conversion of biomass mainly of the lignocellulosic type and their derivatives in liquid fuels for transportation.

PRIOR ART

Biomass, together with $CO_2$, is one of the primary and renewable sources of carbon. The valorisation of biomass (mainly plant or of the lignocellulosic type) and its derivatives represents a sustainable alternative to the use of fossil fuels for the production of fuels and chemicals products, thereby making it possible to reduce the obvious problems of depletion of non-renewable resources and the environmental issues associated therewith [G. W. Huber, S. Iborra, A. Corma. *Chemical Reviews*, 106 (2006) 4044]. In this regard, in the new concept of biorefinery and bioeconomy, the co-production of biofuels is essential along with other chemical products of interest. Also, in the new innovative strategies for the treatment of second-generation biomass (not competitive with food), valorisation of the waste streams and aqueous effluents obtained during the process is needed [F. Cherubini et al., *Biofuels, Bioproducts and Biorefining*, 3 (2009) 534].

In this context, and after a primary treatment of the biomass (mainly plant or lignocellulosic-type), for example, by means of thermal or catalytic pyrolysis processes, so-called pyrolysis oils or bioliquids can mainly be obtained. These bioliquids are complex mixtures of more than 200 components, containing different proportions of water and essentially oxygenated organic compounds (i.e. alcohols, ketones, acids, polyalcohols, furans, phenols, among others) of different molecular size, characterised by their high oxygen content and high degree of reactivity. Bioliquids also have a high degree of acidity due to the presence of short-chain carboxylic acids (C1-C4), which hinders the storage and direct use thereof. These properties, added to their temperature instability, make an improvement or upgrading stage necessary prior to the storage and use thereof. Due to the complexity of these mixtures, difficult to treat as a whole, one of the most frequently used strategies consists of separating the different components of the bioliquid to facilitate the subsequent treatment thereof [documents US 2014/0288338, US 2013/0079566, WO 2015/08110].

After a liquid-liquid separation process by adding water or organic solvents to the bioliquid, it is possible to obtain, on the one hand, an organic phase containing different organic compounds of interest for subsequent use thereof as fuels; and, on the other hand, aqueous fractions and effluents containing short-chain carboxylic acids C1-C4 (mainly acetic acid) together with other compounds such as aldehydes, ketones or alcohols and small amounts of furanic compounds and/or heavier compounds, which are not currently leveraged and constitute waste flows in biorefineries [M. Asadieraghi et al., *Renewable and Sustainable Energy Reviews*, 36 (2014) 286, E. E. Iojoiu et al., *Applied Catalysis A: Gen.* 323 (2007) 147].

These oxygenated organic compounds, most of which are short-chain (<C5), have little value in themselves, but can be efficiently converted to give rise to mixtures of hydrocarbons with longer chains and aromatic compounds that are very useful as precursors, components and/or additives in liquid automotive fuels. These compounds (hydrocarbons and aromatics) are produced through the formation of carbon-carbon bonds through condensation, ketonization, and alkylation with alcohols reactions, which occur consecutively [C. A. Gaertner et al. *Journal of Catalysis*, 266 (2009) 71]. In addition, given the diversity of organic molecules present in the system, other reactions such as decarboxylations, dehydrations or esterifications can occur upon treating these complex aqueous mixtures.

To this end, new catalysts and catalytic processes capable of carrying out the desired reactions in the smallest possible number of stages and with high efficiency must be developed. In this context, the study of Ce—Zr mixed oxide-type solid catalysts is of great relevance [A. Gangadharan et al., *Applied Catalysis A: Gen.* 385 (2010) 80-91], which enable the conversion of low-molecular-weight aldehydes (for example, propanal) in the gaseous phase and at high temperatures (>300° C.) in the presence of carboxylic acids and water, mainly through aldol condensation and ketonization processes. The activity of these materials is due to their multifunctional properties, they have isolated and well-distributed active sites that can function cooperatively (for example, acid-base and redox sites). However, the stability of the catalyst under reaction conditions (presence of water and high temperatures) is a point that can be improved in the new materials to be developed for this type of applications.

DESCRIPTION OF THE INVENTION

The present invention relates to a method for producing mixtures of hydrocarbons and aromatic compounds, which may comprise, at least, the following stages:

(a) bringing an aqueous mixture containing the oxygenated compounds derived from primary biomass treatments in contact with a catalyst, comprising at least W and/or Nb and that, in its calcined form, has at least one material ordered along one of the crystallographic axes and an X-ray diffractogram wherein at least diffraction lines corresponding to angles 2θ to 22.7±0.4 and 46.6±0.4 are observed;

(b) reacting the mixture with the catalyst in a catalytic reactor at temperatures between 50° C. and 450° C. and under pressures of 1 to 120 bar;

(c) recovering the products obtained by a liquid/liquid separation process of the aqueous and organic phases.

According to a particular embodiment, the method of the present invention for the catalytic conversion of the oxygenated compounds contained in aqueous fractions derived from biomass in mixtures of hydrocarbons and aromatic compounds (preferably C5-C16), may use a catalyst with the following empirical formula:

$$W_a Nb_b A_c B_d O_e$$

wherein:

A is a metal of the group of alkaline and alkaline earth metals,

B is a chemical element of the group of transition metals, rare earth or elements of groups III, IV and V.

a and b are comprised between 0 and 12.0, with a+b other than zero (a+b≠0)

c is comprised between 0 and 2.0, d is comprised between 0 and 4.0, and e has a value depending on the state of oxidation of the elements W, Nb and the element B.

According to this embodiment, the catalyst must fulfil the condition that the catalyst comprises at least W and/or Nb and that, in its calcined form, has at least one material ordered along one of the crystallographic axes and an X-ray diffractogram wherein at least diffraction lines corresponding to angles 2θ to 22.7±0.4 and 46.6±0.4 are observed.

Said catalyst can be prepared using conventional methods from solutions of compounds of the different elements, from solutions of the same pure elements, or from the mixture thereof, with the desired atomic ratios. Said solutions are preferably aqueous solutions.

According to another particular embodiment of the present invention, the catalyst will be obtained by means of a method comprising at least:
a) a first stage, wherein compounds of the different elements, of pure elements, or a mixture thereof, are mixed,
b) a second stage, wherein the solid obtained in the first stage is dried and
c) a third stage, wherein the dry solid obtained in the second stage is calcined.

The mixing stage can be carried out from the compounds of the different elements, based on the pure elements in solution, or using hydrothermal methods.

The elements W, Nb and the metals A and B can be added to the mixing stage as pure metallic elements, as salts, as oxides, as hydroxides, as alkoxides, or as mixtures of two or more of the aforementioned forms. Salts are preferably selected from sulphates, nitrates, oxalates or halides, and more preferably sulphates.

W can be added to the mixing stage preferably as wolframic acid, ammonium wolframate, ammonium metawolframate, ammonium parawolframate or wolframium oxide.

Nb can be added to the mixing stage preferably as niobium pentoxide, niobium oxalate, niobium chloride or Nb metal.

The mixing stage can be followed by a period of static permanence in the reactor or the mixture can be mixed with stirring. Both the static permanence and the stirring can be carried out in a normal reactor or in an autoclave.

The mixing stage can be carried out in solution or by hydrothermal treatment.

The drying stage can be carried out using conventional methods in an oven, evaporation with stirring, evaporation in a rotavapor or vacuum drying.

The dry solid calcination stage can be carried out in an inert gas atmosphere, such as for example nitrogen, helium, argon or mixtures thereof, as well as air or mixtures of air with other gases.

This calcination stage can be carried out by forcing the passage of an inert gas flow (with spatial rates between 1 and 400 h$^{-1}$) or in static mode. The temperature will preferably be within the range comprised between 250° C. and 850° C. and more preferably between 450° C. and 650° C. Calcination time is not decisive, but will preferably be comprised in the range between 0.5 and 20 hours. Heating rate is not decisive but will preferably be in the range between 0.1° C./minute and 10° C./minute. The catalyst may also initially be calcined in an oxidising atmosphere up to a temperature comprised between 200° C. and 350° C., and more preferably between 240° C. and 290° C., and subsequently be subjected to calcination in an inert atmosphere.

According to this embodiment, the catalyst is obtained, as mentioned earlier, using hydrothermal methods (containing two or more elements in the synthesis, especially containing W, Nb, and the elements A and B). Synthesis temperature and time may be decisive using hydrothermal methods. Therefore, synthesis temperature is, preferably, comprised between 100° C. and 250° C. and, more preferably, between 150° C. and 180° C. Synthesis time is, preferably, between 6 and 500 hours, and more specifically between 24 and 200 hours.

In an alternative embodiment, the catalyst is obtained by co-precipitation of the elements, whether using precursor compounds containing the different elements or the pure elements in solution. As precursor compounds containing the elements W, Nb and the elements A and B, salts, oxides, hydroxides, alkoxides or mixtures of two or more of the aforementioned forms can be used. Salts are preferably selected from sulphates, nitrates, oxalates or halides, and more preferably sulphates. The solvent can be selected from water, methanol, ethanol, isopropanol, acetonitrile, dioxane, or mixtures thereof, preferably water. The co-precipitation of the elements in the solution is carried out by controlled change of pH by adding a basic compound selected from alkaline metal hydroxides, alkaline earth metal hydroxides, ammonium hydroxide or ammonium water, and alkaline metal hypochlorites, without being limiting examples. Once pH is controlled, the solution is allowed aging and then the solid obtained is washed, dried and subjected to a calcination process to activate the material prior to its use in reaction.

The previously described catalyst can be used for the inventive method as obtained once calcined.

In an alternative embodiment, the previously described catalyst can be supported and/or diluted on a solid such as: silica, alumina, titanium oxide or mixtures thereof, as well as silicon carbide. In such cases, the fixation of the different elements of the catalyst to the support can be carried out using conventional impregnation methods, such as pore volume, excess solution, or simply by precipitation of a solution containing the active elements on the support.

According to another particular embodiment of the method of the present invention, a catalyst can be used which, based on the formula with the composition $W_aNb_bA_cB_dO_e$, wherein d is zero, has the following empirical formula:

$$W_aNb_bA_cO_e$$

wherein:
A is a metal of the group of alkaline or alkaline earth metals
a and b are comprised between 0 and 12, with a+b other than zero (a+b≠0)
c is comprised between 0.0001 and 2.0 and
e has a value depending on the state of oxidation of the elements W and Nb.

Once again, the previous formula must fulfil the condition that the catalyst comprises at least W and/or Nb and that, in its calcined form, has at least one material ordered along one of the crystallographic axes and an X-ray diffractogram wherein at least diffraction lines corresponding to angles 2θ to 22.7±0.4 and 46.6±0.4 are observed.

Said catalyst can be prepared using conventional methods from solutions of compounds of the different elements, from solutions of the same pure elements, or from the mixture thereof, with the desired atomic ratios. Said solutions are preferably aqueous solutions.

The catalyst described in this embodiment can be obtained by means of a method comprising at least:
a) a first stage, wherein compounds of the different elements, of pure elements, or a mixture thereof, are mixed,
b) a second stage, wherein the solid obtained in the first stage is dried, and
c) a third stage, wherein the dry solid obtained in the second stage is calcined.

The mixing stage can be carried out from the compounds of the different elements, based on the pure elements in solution, or using hydrothermal methods.

The elements W, Nb and metal A can be added to the mixing stage as pure metallic elements, as salts, as oxides, as hydroxides, as alkoxides, or as mixtures of two or more of the aforementioned forms. Salts are preferably selected from sulphates, nitrates, oxalates or halides, and more preferably sulphates.

W can be added to the mixing stage preferably as wolframic acid, ammonium wolframate, ammonium metawolframate, ammonium parawolframate or wolframium oxide.

Nb can be added to the mixing stage preferably as niobium pentoxide, niobium oxalate, niobium chloride or Nb metal.

The mixing stage can be followed by a period of static permanence in the reactor, or the mixture can be mixed with stirring. Both the static permanence and the stirring can be carried out in a normal reactor or in an autoclave.

The mixing stage can be carried out in solution or by hydrothermal treatment.

The drying stage can be carried out using conventional methods in an oven, evaporation with stirring, evaporation in a rotavapor, or vacuum drying.

The dry solid calcination stage can be carried out in an inert gas atmosphere such as, for example, nitrogen, helium, argon or mixtures thereof, as well as air or mixtures of air with other gases.

This calcination stage can be carried out by forcing the passage of an inert gas flow (with spatial rates between 1 and 400 $h^{-1}$) or in static mode. The temperature will preferably be within the range comprised between 250° C. and 850° C. and more preferably between 450° C. and 650° C. Calcination time is not decisive, but will preferably be comprised in the range between 0.5 and 20 hours. Heating rate is not decisive, but will preferably be in the range between 0.1° C./minute and 10° C./minute. The catalyst may also initially be calcined in an oxidising atmosphere to a temperature comprised between 200° C. and 350° C., and more preferably between 240° C. and 290° C., and subsequently be subjected to calcination in an inert atmosphere.

According to this embodiment, the catalyst is obtained, as mentioned earlier, using hydrothermal methods (containing two or more elements in the synthesis, especially containing W, Nb and metal A). Synthesis temperature and time may be decisive using hydrothermal methods. Therefore, synthesis temperature is, preferably, between 100° C. and 250° C. and, more specifically, between 150° C. and 180° C. Synthesis time is, preferably, between 6 and 500 hours, and more specifically between 24 and 200 hours.

It is also possible to obtain the catalyst by co-precipitation of the elements, whether from precursor compounds containing the different elements or from the pure elements in solution. The precursor compounds containing the elements W, Nb and element A that can be used include salts, oxides, hydroxides, alkoxides or mixtures of two or more of the aforementioned forms. Salts are preferably selected from sulphates, nitrates, oxalates or halides, and more preferably sulphates. The solvent can be selected from water, methanol, ethanol, isopropanol, acetonitrile, dioxane and mixtures thereof, preferably water. The co-precipitation of the elements in the solution is carried out by controlled change of pH by adding a basic compound selected from alkaline metal hydroxides, alkaline earth metal hydroxides, ammonium hydroxide or ammonium water, alkaline metal hypochlorites, without being limiting examples. Once pH is controlled, the solution is allowed aging and then the solid obtained is washed, dried and subject to a calcination process to activate the material prior to its use in reaction.

The previously described catalyst can be used for the inventive method as obtained once calcined.

In an alternative embodiment, the previously described catalyst can be supported and/or diluted on a solid such as: silica, alumina, titanium oxide or mixtures thereof, as well as silicon carbide. In such cases, the fixation of the different elements of the catalyst to the support can be carried out using conventional impregnation methods, such as pore volume, excess solution, or simply by precipitation of a solution containing the active elements on the support.

According to another particular embodiment of the method present invention, a catalyst can be used which, based on the formula with the composition $W_aNb_bA_cB_dO_e$, wherein c is zero, has the following empirical formula:

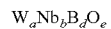

wherein:
  B is a chemical element of the group of transition metals, rare earth or elements of groups III, IV and V
  a and b are comprised between 0 and 12.0, with a+b other than zero (a+b≠0)
  d is comprised between 0.0001 and 4.0, and
  has a value depending on the state of oxidation of the elements W, Nb and the element B.

Again with the condition that the catalyst comprises at least W and/or Nb and that, in its calcined form, has at least one material ordered along one of the crystallographic axes and an X-ray diffractogram wherein at least diffraction lines corresponding to angles 2θ to 22.7±0.4 and 46.6±0.4 are observed.

Said catalyst can be prepared using conventional methods from solutions of compounds of the different elements, from solutions of the same pure elements, or from the mixture thereof, with the desired atomic ratios. Said solutions are preferably aqueous solutions.

The catalyst will be obtained by means of a method comprising at least:
a) a first stage, wherein compounds of the different elements, of pure elements, or a mixture thereof, are mixed,
b) a second stage, wherein the solid obtained in the first stage is dried and
c) a third stage, wherein the dry solid obtained in the second stage is calcined.

The mixing stage can be carried out using the compounds of the different elements, the pure elements in solution, or using hydrothermal methods.

The elements W, Nb and the metal B can be added to the mixing stage as pure metallic elements, as salts, as oxides, as hydroxides, as alkoxides, or as mixtures of two or more of the aforementioned forms. Salts are preferably selected from sulphates, nitrates, oxalates or halides, and more preferably sulphates.

W can be added to the mixing stage preferably as wolframic acid, ammonium wolframate, ammonium metawolframate, ammonium parawolframate or wolframium oxide.

Nb can be added to the mixing stage preferably as niobium pentoxide, niobium oxalate, niobium chloride or Nb metal.

The mixing stage can be followed by a period of static permanence in the reactor, or mixing can be carried out with stirring. Both static permanence and stirring can be carried out in a normal reactor or in an autoclave.

The mixing stage can be carried out in solution or by hydrothermal treatment.

The drying stage can be carried out using conventional methods in an oven, evaporation with stirring, evaporation in a rotavapor, or vacuum drying.

The dry solid calcination stage can be carried out in an inert gas atmosphere, such as for example nitrogen, helium, argon or mixtures thereof, as well as air or mixtures of air with other gases.

This calcination stage can be carried out by forcing the passage of an inert gas flow (with spatial rates between 1 and 400 h$^{-1}$) or in static mode. The temperature will preferably be within the range comprised between 250° C. and 850° C. and more preferably between 450° C. and 650° C. Calcination time is not decisive, but will preferably be comprised in the range between 0.5 and 20 hours. Heating rate is not decisive, but will preferably be in the range between 0.1° C./minute and 10° C./minute. The catalyst may also initially be calcined in an oxidising atmosphere to a temperature comprised between 200° C. and 350° C., and more preferably between 240° C. and 290° C., and subsequently be subjected to calcination in an inert atmosphere.

According to this embodiment, the catalyst is obtained, as mentioned earlier, using hydrothermal methods (containing two or more elements in the synthesis, especially containing W, Nb and the element B). Synthesis temperature and time may be decisive using hydrothermal methods. Therefore, synthesis temperature is, preferably, between 100° C. and 250° C. and, more specifically, between 150° C. and 180° C. Synthesis time is, preferably, between 6 and 500 hours, and more specifically between 24 and 200 hours.

It is also possible to obtain the catalyst by co-precipitation of the elements, whether from precursor compounds containing the different elements or from the pure elements in solution. The precursor compounds containing the elements W, Nb and the element B that can be used include salts, oxides, hydroxides, alkoxides or mixtures of two or more of the aforementioned forms. Salts are preferably selected from sulphates, nitrates, oxalates or halides, and more preferably sulphates. The solvent can be selected from water, methanol, ethanol, isopropanol, acetonitrile, dioxane and mixtures thereof, preferably water. The co-precipitation of the elements in the solution is carried out by controlled change of pH by adding a basic compound selected from alkaline metal hydroxides, alkaline earth metal hydroxides, ammonium hydroxide or ammonium water, alkaline metal hypochlorites, without being limiting examples. Once pH is controlled, the solution is allowed aging and then the solid obtained is washed, dried and subjected to a calcination process to activate the material prior to its use in reaction.

In another alternative embodiment of the present invention, other elements, such as an alkaline metal or alkaline earth metal, can also be added after the calcination stage by impregnation or precipitation. In this case, the resulting solid will be subjected to a second calcination stage.

The previously described catalyst can be used for the inventive method as obtained once calcined.

According to an alternative embodiment, the catalyst previously described in this invention can be supported and/or diluted on a solid such as: silica, alumina, titanium oxide or mixtures thereof, as well as silicon carbide. In such cases, the fixation of the different elements of the catalyst to the support can be carried out using conventional impregnation methods, such as pore volume, excess solution, or simply by precipitation of a solution containing the active elements on the support.

According to another particular embodiment of the method of the present invention, a catalyst can be used which, based on the formula with the composition $W_aNb_bA_cB_dO_e$, wherein c and d are zero, has the following empirical formula:

$$W_aNb_bO_e$$

wherein:
a and b are comprised between 0 and 12, with a+b other than zero (a+b≠0)
e has a value depending on the state of oxidation of the elements W and Nb.

With the condition that the catalyst comprises at least W and/or Nb and that, in its calcined form, has at least one material ordered along one of the crystallographic axes and an X-ray diffractogram wherein at least diffraction lines corresponding to angles 2θ to 22.7±0.4 and 46.6±0.4 are observed.

Said catalyst can be prepared using conventional methods from solutions of compounds of the different elements, from solutions of the same pure elements, or from mixtures thereof, with the desired atomic ratios. Said solutions are preferably aqueous solutions.

According to this embodiment, the catalyst can be obtained by means of a method comprising at least:
a) a first stage, wherein the compounds of the different elements, of pure elements, or a mixture thereof, are mixed,
b) a second stage, wherein the solid obtained in the first stage is dried and
c) a third stage, wherein the dry solid obtained in the second stage is calcined.

The mixing stage can be carried out using the compounds of the different elements, the pure elements in solution, or using hydrothermal methods.

The elements W and Nb can be added to the mixing stage as pure metallic elements, as salts, as oxides, as hydroxides, as alkoxides, or as mixtures of two or more of the aforementioned forms. Salts are preferably selected from sulphates, nitrates, oxalates or halides, and more preferably sulphates.

W can be added to the mixing stage preferably as wolframic acid, ammonium wolframate, ammonium metawolframate, ammonium parawolframate or wolframium oxide.

Nb can be added to the mixing stage preferably as niobium oxalate, niobium pentoxide, niobium chloride or Nb metal.

The mixing stage can be followed by a period of static permanence in the reactor, or mixing can be carried out with stirring. Both static permanence and stirring can be carried out in a normal reactor or in an autoclave.

The mixing stage can be carried out in solution or by hydrothermal treatment.

The drying stage can be carried out using conventional methods in an oven, evaporation with stirring, evaporation in a rotavapor, or vacuum drying.

The dry solid calcination stage can be carried out in an inert gas atmosphere such as, for example, nitrogen, helium, argon or mixtures thereof, as well as air or mixtures of air with other gases.

This calcination stage can be carried out by forcing the passage of an inert gas flow (with spatial rates between 1 and 400 h$^{-1}$) or in static mode. The temperature will preferably be within the range comprised between 250° C. and 850° C. and more preferably between 450° C. and 650° C. Calcination time is not decisive, but will preferably be comprised in the range between 0.5 and 20 hours. Heating rate is not decisive, but will preferably be in the range between 0.1° C./minute and 10° C./minute. The catalyst may also initially be calcined in an oxidising atmosphere to a temperature comprised between 200° C. and 350° C., and more preferably between 240° C. and 290° C., and subsequently be subjected to calcination in an inert atmosphere.

According to this particular embodiment, the catalyst can be obtained, as mentioned earlier, using hydrothermal methods (containing two or more elements in the synthesis, especially containing W and Nb). Synthesis temperature and time may be decisive using hydrothermal methods. Therefore, synthesis temperature is, preferably, between 100° C. and 250° C. and, more specifically, between 150° C. and 180° C. Synthesis time is, preferably, between 6 and 500 hours and, more specifically, between 24 and 200 hours.

In addition, the catalyst can be obtained by co-precipitation of the elements, whether from precursor compounds containing the different elements or from the pure elements in solution. The precursor compounds containing the elements W and Nb that can be used include salts, oxides, hydroxides, alkoxides or mixtures of two or more of the aforementioned forms. Salts are preferably selected from sulphates, nitrates, oxalates or halides, and more preferably sulphates. The solvent can be selected from water, methanol, ethanol, isopropanol, acetonitrile, dioxane and mixtures thereof, preferably water. The co-precipitation of the elements in the solution is carried out by controlled change of pH by adding a basic compound selected from alkaline metal hydroxides, alkaline earth metal hydroxides, ammonium hydroxide or ammonium water, alkaline metal hypochlorites, without being limiting examples. Once pH is controlled, the solution is allowed aging and then the solid obtained is washed, dried and subjected to a calcination process to activate the material prior to its use in reaction.

According to the particular embodiment, other elements, such as an alkaline metal or alkaline earth metal, can also be added after the calcination stage by impregnation or precipitation. In this case, the resulting solid will be subjected to a second calcination stage.

The catalyst described according to this embodiment can be used for the inventive method as obtained once calcined.

In an alternative embodiment, the catalyst previously described in this invention can be supported and/or diluted on a solid such as: silica, alumina, titanium oxide or mixtures thereof, as well as silicon carbide. In such cases, the fixation of the different elements of the catalyst to the support can be carried out using conventional impregnation methods, such as pore volume, excess solution, or simply by precipitation of a solution containing the active elements on the support.

The method of the present invention has the following advantages over the state of the art:
  catalysts comprising W and/or Nb, and combinations of Nb and W with other elements, wherein at least W and/or Nb are present in the form of at least one oxide, provide greater yields to C5-C8 hydrocarbons than those reported with catalysts based on Ce—Zr, with total yields (≈20%) comparable to those observed for these Ce—Zr materials;
  they are more stable and resistant under reaction conditions than other reported catalytic materials;
  they require a lower temperature to carry out the process when compared to data reported in literature for other catalytic materials.

According to the present invention, the metal A of the catalyst can be selected from the group of alkaline and alkaline earth metals, preferably Li, Na, K, Cs, Be, Mg, Ca, Sr, Ba, and combinations thereof and more preferably Na, K, Cs, Mg, Ca and combinations thereof.

Also, element B can be selected from the group of transition metals, preferably Ti, V, Cr, Mn, Fe, Co, Ni, Cu, Zn, Zr, Mo, Ta, TI, Re and combinations thereof; rare earth, preferably La, Ce and combinations thereof; and elements of groups III, IV and V, preferably B, Al, Ga, Si, Sn, and Sb.

According to a particular embodiment, element B is selected from Ti, V, Mn, Cu, Zn, Zr, La, Ce, Al, Si and combinations thereof.

According to the method of the present invention, at the end thereof mixtures of hydrocarbons and aromatic compounds with between 5 and 16 C atoms can be obtained.

According to a particular embodiment, the product obtained can be selected from linear, branched, cyclical aliphatic hydrocarbons containing between 5 and 16 C atoms, and may also contain between 0 and 4 O atoms, and more preferably between 0 and 2 O atoms.

According to another particular embodiment, the product obtained can be selected from aromatic compounds containing between 5 and 16 C atoms, and can also contain between 0 and 4 O atoms.

According to the method of the present invention, the aqueous mixture derived from biomass introduced in the first step can contain oxygenated compounds containing between 1 and 12 carbon atoms, preferably between 1 and 9 carbon atoms, and can also contain between 1 and 9 oxygen atoms, preferably between 1 and 6 oxygen atoms.

According to the present invention, the total concentration of the oxygenated compounds contained in the aqueous mixture derived from biomass is preferably in the range comprised between 0.5% and 99.5% by weight, and more preferably between 1.0% and 70.0% by weight.

In the method described according to the present invention, the contact between the aqueous mixture and the catalyst is carried out in a reactor preferably selected from a discontinuous reactor, a continuous stirred-tank reactor, a continuous fixed-bed reactor and a continuous fluidised-bed reactor.

According to a particular embodiment, the reactor is a discontinuous reactor and the reaction is carried out in the liquid phase at a pressure preferably selected between 1 and 120 bar, and more preferably between 1 and 80 bar. In addition, the reaction can be carried out at a temperature between 50° C. and 350° C., preferably between 120° C. and 280° C. The contact time between the aqueous mixture containing the oxygenated compounds derived from biomass and the catalyst can range between 2 minutes and 200 hours, preferably between 1 hour and 100 hours. According to this particular embodiment, the weight ratio between the aqueous mixture containing the oxygenated compounds derived from biomass and the catalyst can be found preferably between 1 and 200, and more preferably between 2.5 and 100.

According to another particular embodiment, the reactor used in the method of the present invention can be a fixed-bed reactor or a fluidised-bed reactor. In this case, the reaction temperature is preferably comprised in the range comprised between 50° C. and 450° C., and more preferably between 150° C. and 350° C.; the contact time (W/F) is comprised between 0.001 and 200 s; and working pressure is between 1 and 100 bar, and more preferably between 1 and 60 bar.

According to the previously described method, the contact between the aqueous fraction containing the oxygenated compounds and the catalyst can be carried out in a nitrogen, argon, hydrogen, air, nitrogen-enriched air or argon-enriched air atmosphere, or combinations thereof.

According to a particular embodiment, the method is preferably carried out in a nitrogen atmosphere.

According to another particular embodiment, the method is preferably carried out in an air or nitrogen-enriched air atmosphere.

As mentioned earlier, the present invention describes the use of the catalyst obtained as described earlier to obtain mixtures of hydrocarbons and aromatic compounds, preferably containing between 5 and 16 C atoms (C5-C16) of use in liquid fuels, based on the catalytic conversion of the oxygenated compounds contained in aqueous fractions derived from biomass.

The aqueous fractions derived from biomass containing the different oxygenated compounds to be treated with the method of the present invention may be selected from aqueous fractions obtained by liquid-liquid separation of the bioliquids produced by the thermal and/or catalytic pyrolysis of biomass, aqueous fractions obtained by chemical and/or enzymatic hydrolysis of biomass, aqueous fractions obtained by liquefaction under sub- or super-critical biomass conditions, and aqueous fractions obtained from the fermentation of biomass for the selective production of ethanol, butanol, succinic acid, and lactic acid, without being limiting examples.

The aqueous fractions derived from biomass to be treated with the method of the present invention can contain different oxygenated compounds containing between 1 and 12 Carbon atoms, preferably between 1 and 9 Carbon atoms.

In addition, the aqueous fractions derived from biomass to be treated with the method of the present invention can contain different oxygenated compounds containing between 1 and 9 Oxygen atoms, preferably between 1 and 6 Oxygen atoms.

The aqueous fractions derived from biomass to be treated with the method of the present invention can contain different oxygenated compounds in concentrations comprised in the range between 0.5% and 99.5% by weight with respect to the amount of water, preferably between 1.0% and 70.0% by weight with respect to the amount of water.

According to a particular embodiment, the aqueous fractions derived from biomass to be treated with the method of the present invention can contain different oxygenated compounds, including alcohols, aldehydes, ketones, carboxylic acids and diacids, esters, ethers, diols, triols and polyalcohols in general, sugars, furanic derivatives, and phenolic derivatives, without being limiting examples.

According to another particular embodiment, the aqueous fractions derived from biomass to be treated with the method of the present invention can contain different oxygenated compounds of the alcohol type, including methanol, ethanol, 1-propanol, 2-propanol, 1-butanol, 2-butanol, 1-pentanol, 2-pentanol, isopentanol, 1-hexanol, 2-hexanol, 3-hexanol, and furfuryl alcohol, without being limiting examples.

According to another particular embodiment, the aqueous fractions derived from biomass to be treated with the method of the present invention can contain different oxygenated compounds of the aldehyde type, including formaldehyde, acetaldehyde, propanal, butanal, 2-butenal, pentanal, 2-pentenal, 3-pentenal, hexanal, 2-hexenal, 3-hexenal, 2-methyl-2-pentenal, 2-methyl-3-pentenal, 3-methyl-2-pentenal, furfural, and 5-hydroxy-methyl-furfural, without being limiting examples.

According to another particular embodiment, the aqueous fractions derived from biomass to be treated with the method of the present invention can contain different oxygenated compounds of the ketonic type, including acetone, 2-butanone, 2-pentanone, penten-2-one, 3-pentanone, penten-3-one, 2-hexanone, hexen-2-one, 3-hexanone, hexen-3-one, isophorone, vanillin, aceto-vanillin, syringone, and acetosyringone, without being limiting examples.

According to another particular embodiment, the aqueous fractions derived from biomass to be treated with the method of the present invention can contain different oxygenated compounds of the acid and diacid type, including acetic acid, propionic acid, butyric acid, pentanoic acid, hexanoic acid, lactic acid, pyruvic acid, levulinic acid, tartronic acid, tartaric acid, glycolic acid, succinic acid, gluconic acid, and glucaric acid, without being limiting examples.

According to another particular embodiment, the aqueous fractions derived from biomass to be treated with the method of the present invention can contain different oxygenated compounds of the ester type, including methyl acetate, ethyl acetate, propyl acetate, butyl acetate, methyl propionate, ethyl propionate, propyl propionate, butyl propionate, methyl butyrate, ethyl butyrate, propyl butyrate, and butyl butyrate, without being limiting examples.

According to another particular embodiment, the aqueous fractions derived from biomass to be treated with the method of the present invention can contain different oxygenated compounds of the ether type, including dimethyl ether, diethyl ether, dipropyl ether, diisopropyl ether, dibutyl ether, di-sec-butyl ether, methyl-ethyl ether, methyl-propyl ether, methyl-isopropyl ether, methyl-butyl ether, methyl-sec-butyl ether, ethyl-propyl ether, ethyl-isopropyl ether, ethyl-butyl ether, ethyl-sec-butyl ether, propyl-butyl ether, and propyl-sec-butyl ether, without being limiting examples.

According to another particular embodiment, the aqueous fractions derived from biomass to be treated with the method of the present invention can contain different oxygenated compounds of the diol type, including ethylenglycol, 1,2-propanediol, 1,3-propanediol, 1,2-butanediol, 1,3-butanediol, 1,4-butanediol, 2,3-butanediol, 1,2-pentanediol, 1,3-pentanediol, 1,4-pentanediol, 1,5-pentanediol, 2,3-pentanediol, 2,4-pentanediol, 1,2-hexanediol, 1,3-hexanediol, 1,4-hexanediol, 1,6-hexanediol, 2,3-hexanediol, 2,4-hexanediol; triols, including glycerol, 1,2,3-butanetriol, 1,2,4-butanetriol, 1,2,3-pentanetriol, 1,2,4-pentanetriol, 1,2,3-hexanetriol, 1,2,4-hexanetriol, 1,2,5-hexanetriol, 1,2,6-hexanetriol, 2,3,4-hexanetriol, 2,3,5-hexanetriol, 2,3,6-hexanetriol, 1,3,6-hexanetriol, 1,4,6-hexanetriol; and polyalcohols, including monosugars of the glucose, fructose, and arabinose type, without being limiting examples.

According to another particular embodiment, the aqueous fractions derived from biomass to be treated with the method of the present invention can contain different oxygenated compounds of the furanic type, including furan, 2-methyl-furan, 5-methyl-furan, 2,5-dimethyl-furan, 2-ethyl-furan, 5-ethyl-furan, 2,5-diethyl-furan, benzofuran, methyl benzofuran, ethyl benzofuran, without being limiting examples.

The aqueous fractions derived from biomass to be treated with the method of the present invention can contain different oxygenated compounds of the phenolic derivative type, including phenol, benzyl alcohol, acetol, o-cresol, m-cresol, p-cresol, guaiacol, vanillin alcohol, syringol, and acetosyringol, without being limiting examples.

The mixtures of organic compounds containing between 5 and 16 C atoms (C5-C16) obtained as a product of the conversion of the oxygenated compounds contained in the aqueous fractions derived from biomass can contain compounds of the linear, branched, cyclical aliphatic hydrocarbons containing between 5 and 16 C atoms, and can also contain between 0 and 4 O atoms, preferably between 0 and 2 O atoms.

The mixtures of organic compounds containing between 5 and 16 C atoms (C5-C16) obtained as a product of the conversion of the oxygenated compounds contained in the aqueous fractions derived from biomass can contain aromatic-type compounds containing between 5 and 16 C atoms, and can also contain between 0 and 4 O atoms, preferably between 0 and 2 O atoms. These aromatic compounds can have one, two or more substitutes in the ring, and said substitutes can be of the linear, branched and/or cyclical alkyl, linear, branched and/or cyclical alkoxide, acetyl, tetrahydrofuranic, furanic and aromatic type, without being limiting examples.

Unless defined otherwise, all the technical and scientific terms used herein have the same meaning commonly understood by a person skilled in the art to which the present invention pertains. Methods and materials similar or equivalent to those described herein in the practice of the present invention may be used. Throughout the description and claims, the word "comprises" and its variations are not intended to exclude other technical features, additives, components or stages. Additional objects, advantages and features of the invention shall be evident to persons skilled in the art after examining the description or can be learned through the practice of the invention. The following examples, figures, are provided by way of illustration but not limitation of the present invention.

EXAMPLES

Next, the inventors will illustrate the invention by means of different tests performed by the inventors that demonstrate the preparation of the catalysts and their application to the method of the invention.

Figure 1:
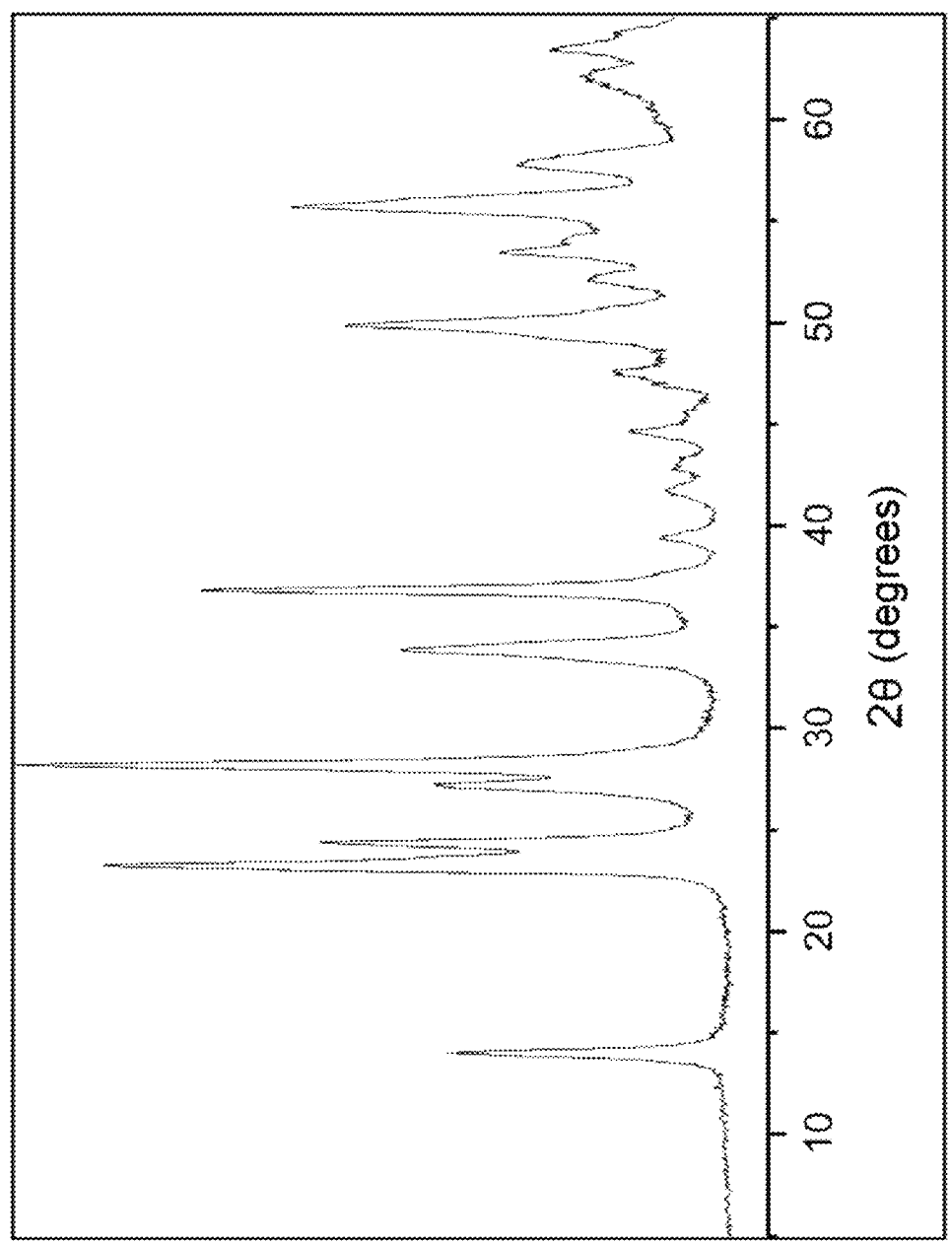
FIG. 1. Shows an X-ray diffractogram of the catalyst based on wolframium oxide [W—O hydrot.] described in Example 1.

Example 1. Preparation of a Catalyst Using the Hydrothermal Method, Based on Wolframium Oxide [W—O] and Treated in Nitrogen 31.7 g of ammonium wolframium, 2.0 g of oxalic acid and 2.45 g of 37% hydrochloric acid are added to 134.8 g of water at 80° C. and stirred for 30 minutes. The resulting mixture is transferred to a Teflon-lined steel autoclave. The autoclave is maintained at 175° C., in static mode, for 2 days. The solid obtained is heated at 450° C. for 2 hours under a nitrogen flow to obtain the catalyst. This catalyst is characterised by the fact that it presents an X-ray diffractogram such as that shown in FIG. 1.

Figure 2:
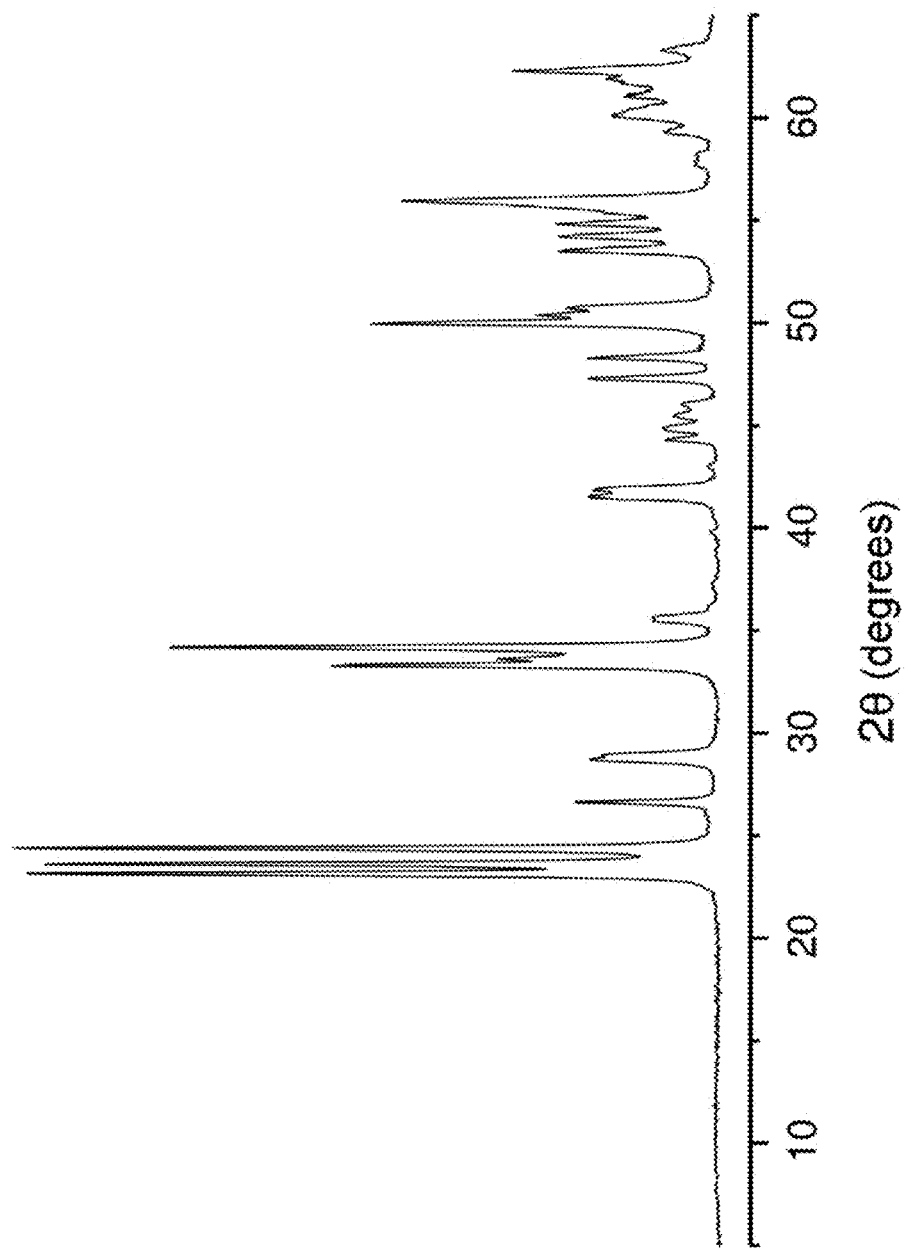
FIG. 2. Shows an X-ray diffractogram of the catalyst based on wolframium oxide [W—O hydrot.] described in Example 2.

Example 2. Preparation of a Catalyst Similar to that of Example 1, but Thermally Activated in Air 31.7 g of ammonium wolframium, 2.0 g of oxalic acid and 2.45 g of 37% hydrochloric acid are added to 134.8 g of water at 80° C. and stirred for 30 minutes. The resulting mixture is transferred to a Teflon-lined steel autoclave. The autoclave is maintained at 175° C., in static mode, for 2 days. The solid obtained is heated at 600° C. for 2 hours under an air flow. This catalyst is characterised by the fact that it presents an X-ray diffractogram such as that shown in FIG. 2.

Example 3. Preparation of a Catalyst Using the Hydrothermal Method, Based on Wolframium and Niobium Oxides with a W/Nb Molar Ratio=1.8 [W—Nb—O (1.8)] and Treated in Nitrogen 44.0 g of ammonium metawolframate and 5.88 g of 96% sulfuric acid are added to 235.7 g of water at 80° C.

Figure 3:
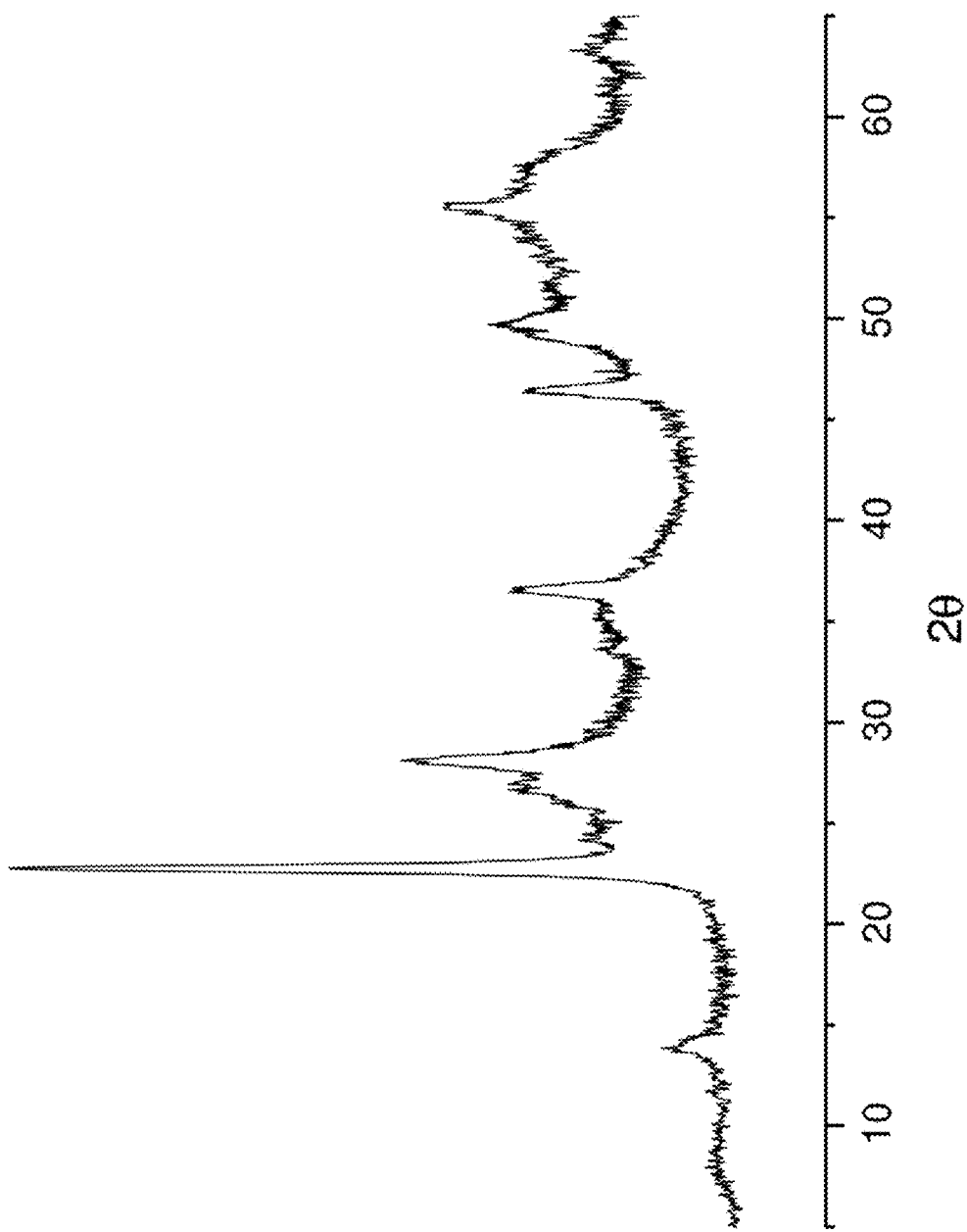
FIG. 3. Shows an X-ray diffractogram of the catalyst based on wolframium and niobium oxides [W—Nb—O (1.8)] described in Example 3.

Furthermore, and after heating at 40° C., a solution is prepared with 65.9 g of deionised water and 27.2 g of niobium oxalate, which is added to the previous solution. The resulting mixture is transferred to a Teflon-lined steel autoclave. The autoclave is maintained at 175° C., in static mode, for 2 days. The solid obtained is heated at 550° C. for 2 hours under a nitrogen flow to obtain the catalyst. This catalyst is characterised by the fact that it presents an X-ray diffractogram such as that shown in FIG. 3.

Figure 4:
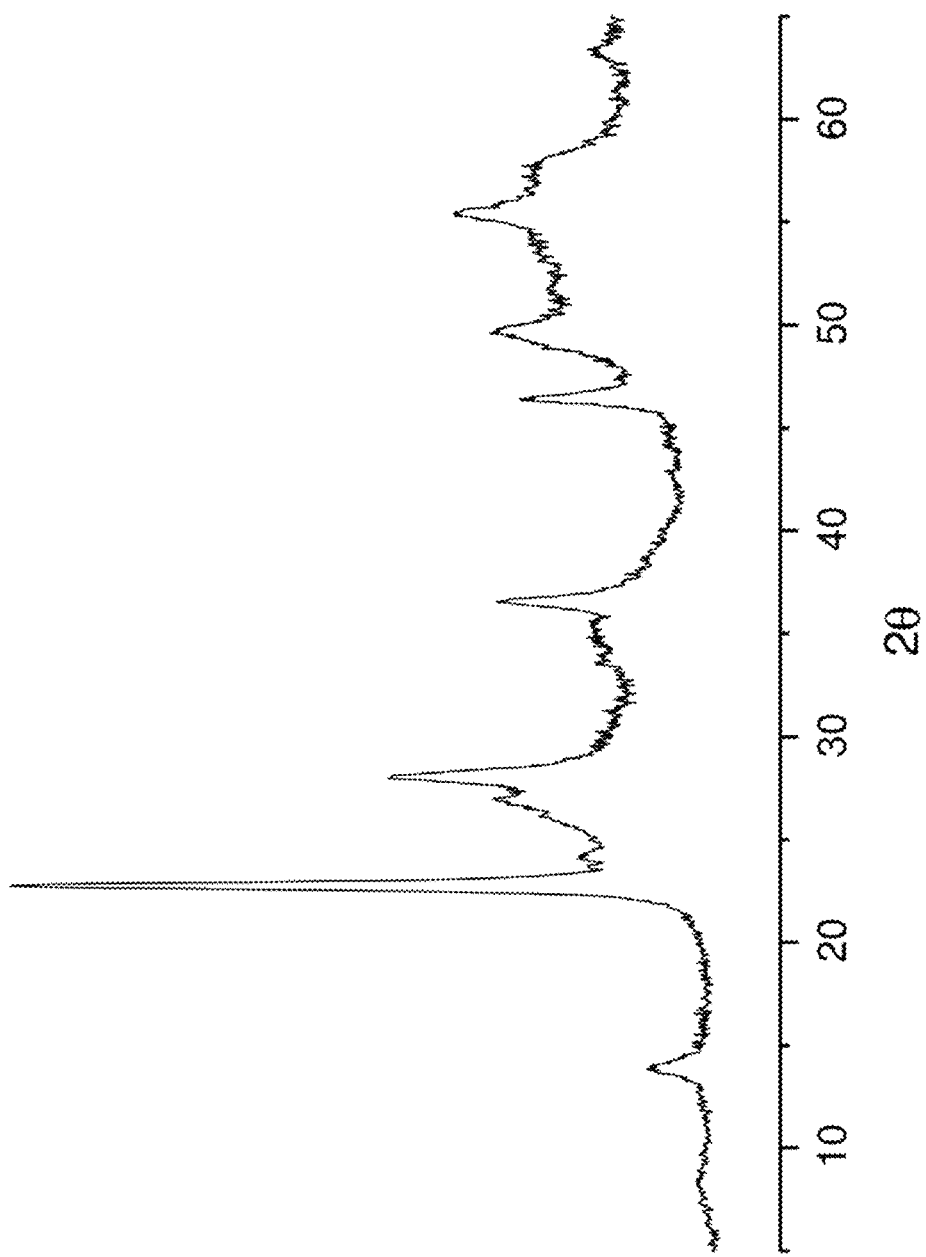
FIG. 4. Shows an X-ray diffractogram of the catalyst based on wolframium and niobium oxides [W—Nb—O (1.8)] described in Example 4.

Example 4. Preparation of a Catalyst Using the Hydrothermal Method, Based on Wolframium and Niobium Oxides with a W/Nb Molar Ratio=1.8 [W—Nb—O (1.8)] and Treated in Air 25.7 g of ammonium metawolframate and 2.5 g of 37% hydrochloric acid are added to 136.5 g of water at 80° C. Furthermore, and after heating at 40° C., a solution is prepared with 38.7 g of deionised water and 26.2 g of niobium oxalate, which is added to the previous solution. The resulting mixture is transferred to a Teflon-lined steel autoclave. The autoclave is maintained at 175° C., in static mode for 2 days and the solid obtained is treated at 100° C. for 16 hours. Lastly, the material is thermally treated at 550° C. for 2 hours under an air flow. This catalyst is characterised by the fact that it presents an X-ray diffractogram such as that shown in FIG. 4.

Figure 5:
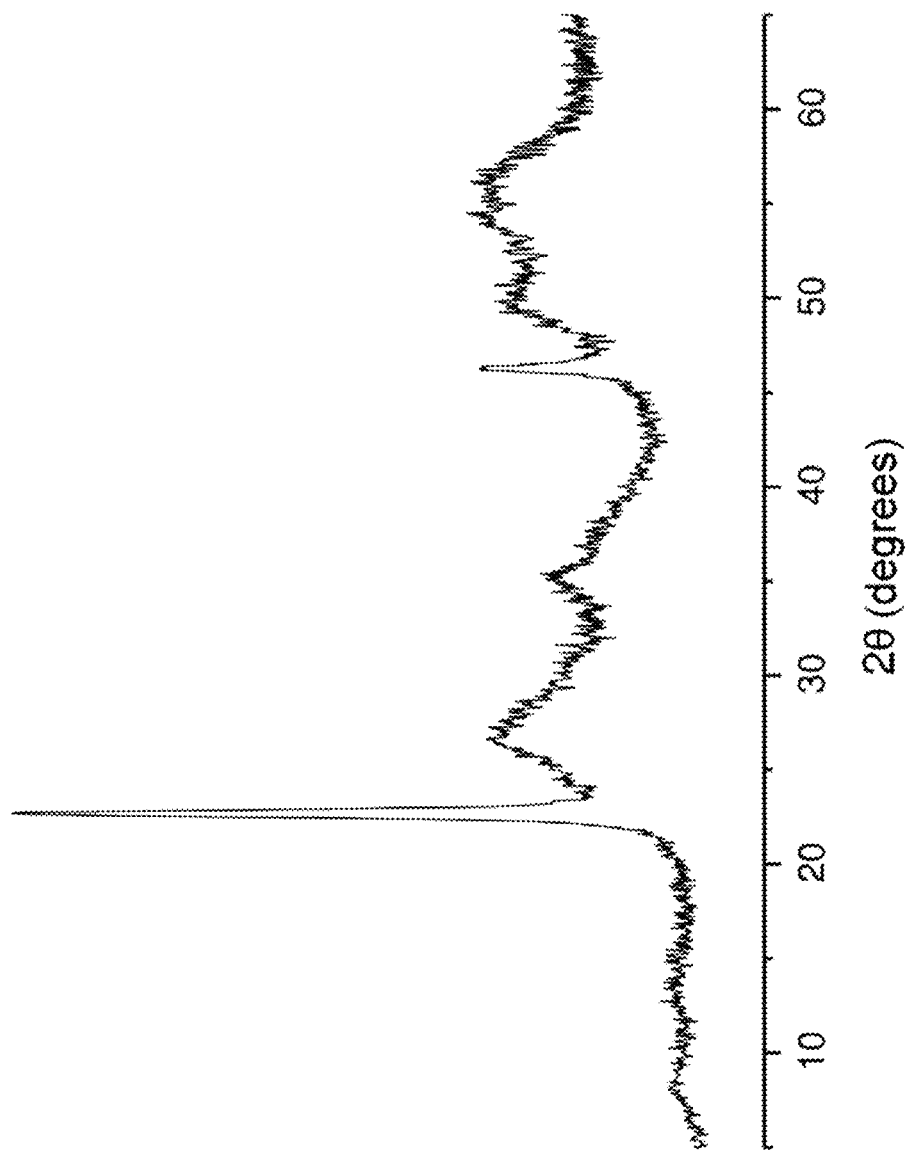
FIG. 5. Shows an X-ray diffractogram of the catalyst based on wolframium and niobium oxides [W—Nb—O (1.0)] described in Example 5.

Example 5. Preparation of a Catalyst Using the Hydrothermal Method, Based on Wolframium and Niobium Oxides with a W/Nb Molar Ratio=1.0 [W—Nb—O (1.0)] and Treated in Nitrogen 25.87 g of ammonium metawolframate and 1.90 g of 96% sulfuric acid are added to 134.5 g of water at 80° C. Furthermore, and after heating at 80° C., a solution is prepared with 71.5 g of deionised water and 48.5 g of niobium oxalate, which is added to the previous solution. The resulting mixture is transferred to a Teflon-lined steel autoclave. The autoclave is maintained at 175° C., in static mode, for 2 hours and the solid obtained is dried at 100° C. for 16 hours. Lastly, the material is heated at 550° C. for 2 hours under a nitrogen flow. This catalyst is characterised by the fact that it presents an X-ray diffractogram such as that shown in FIG. 5.

Figure 6:
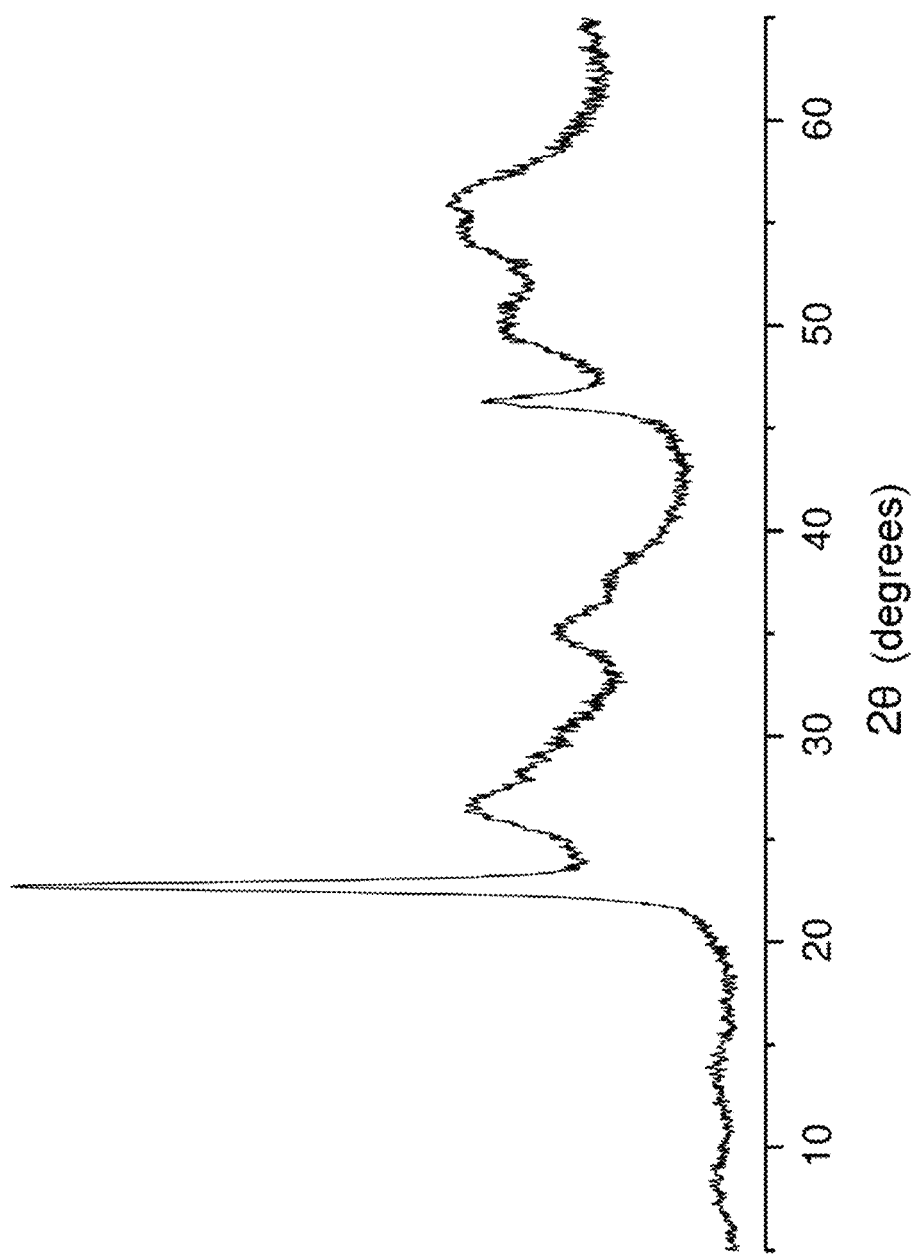
FIG. 6. Shows an X-ray diffractogram of the catalyst based on wolframium and niobium oxides [W—Nb—O (0.7)] described in Example 6.

Example 6. Preparation of a Catalyst Using the Hydrothermal Method, Based on Wolframium and Niobium Oxides with a W/Nb Molar Ratio=0.7 [W—Nb—O (0.7)] and Treated in Nitrogen 10.35 g of ammonium metawolframate and 0.76 g of 96% sulfuric acid are added to 53.8 g of water at 80° C. Furthermore, and after heating at 40° C., a solution is prepared with 28.6 g of deionised water and 19.26 g of niobium oxalate, which is added to the previous solution. The resulting mixture is transferred to a Teflon-lined steel autoclave. The autoclave is maintained at 175° C., in static mode, for 2 days. The solid obtained is heated at 550° C. for 2 hours under a nitrogen flow to obtain the catalyst. This catalyst is characterised by the fact that it presents an X-ray diffractogram such as that shown in FIG. 6.

Figure 7:
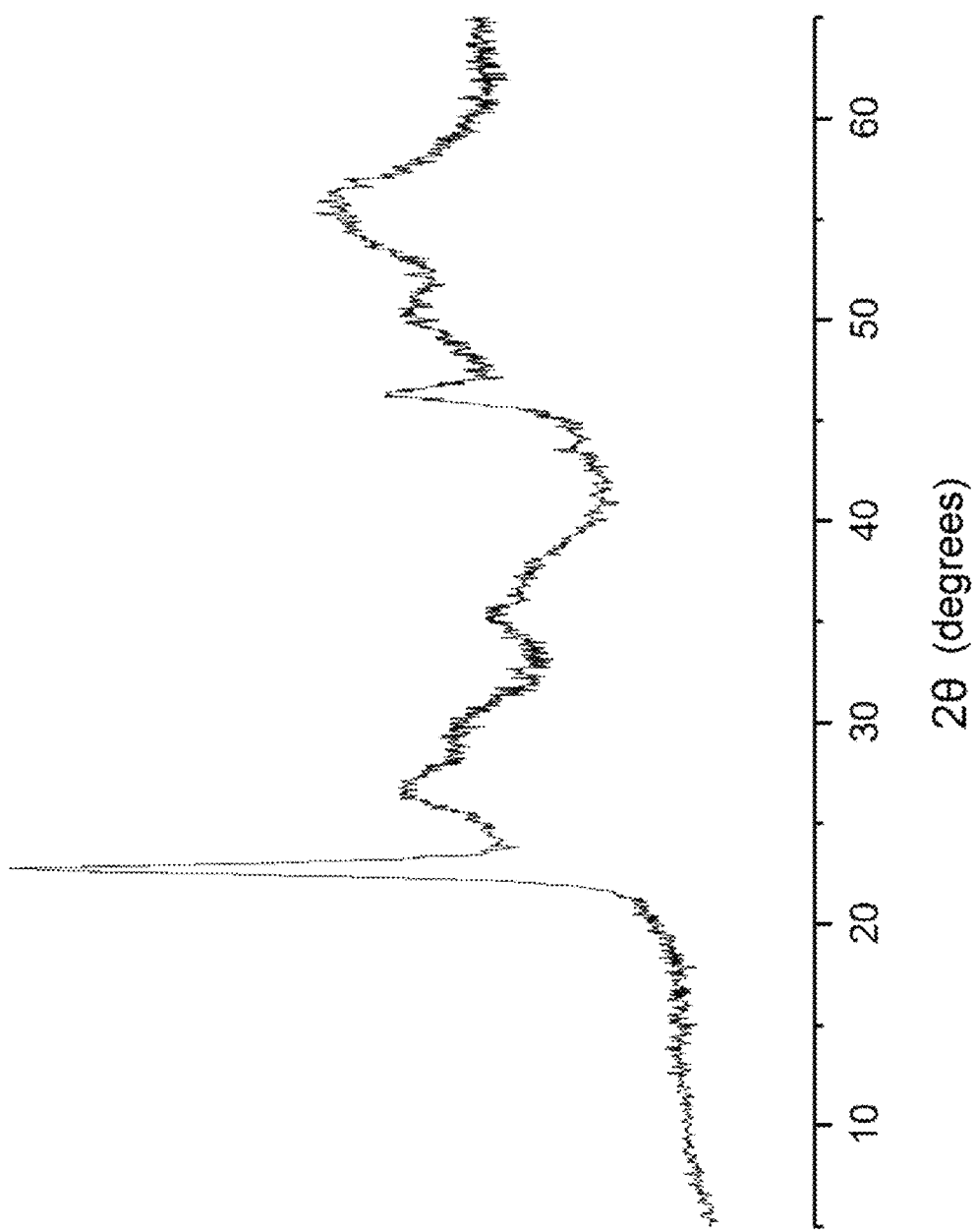
FIG. 7. Shows an X-ray diffractogram of the catalyst based on wolframium and niobium oxides [W—Nb—O (0.3)] described in Example 7.

Example 7. Preparation of a Catalyst Using the Hydrothermal Method, Based on Wolframium and Niobium Oxides with a W/Nb Molar Ratio=0.3 [W—Nb—O (0.3)] and Treated in Nitrogen 4.07 g of ammonium metawolframate and 1.1 g of 37% hydrochloric acid are added to 54.9 g of water at 80° C. and stirred for 30 minutes. Simultaneously, a solution of 30.6 g of niobium oxalate is prepared in 29.9 g of water, which is slowly added to the first. The resulting mixture is transferred to a Teflon-lined steel autoclave. The autoclave is maintained at 175° C., in static mode, for 2 days. The solid obtained is treated at 100° C. for 16 hours and finally heated at 550° C. for 2 hours under a nitrogen flow. This catalyst is characterised by the fact that it presents an X-ray diffractogram such as that shown in FIG. 7.

Example 8. Preparation of a Catalyst Using the Hydrothermal Method, Based on Wolframium and Niobium Oxides with a W/Nb Molar Ratio=1.0 [W—Nb—O (1.0)] and Treated in Nitrogen at 300° C.

Figure 8:
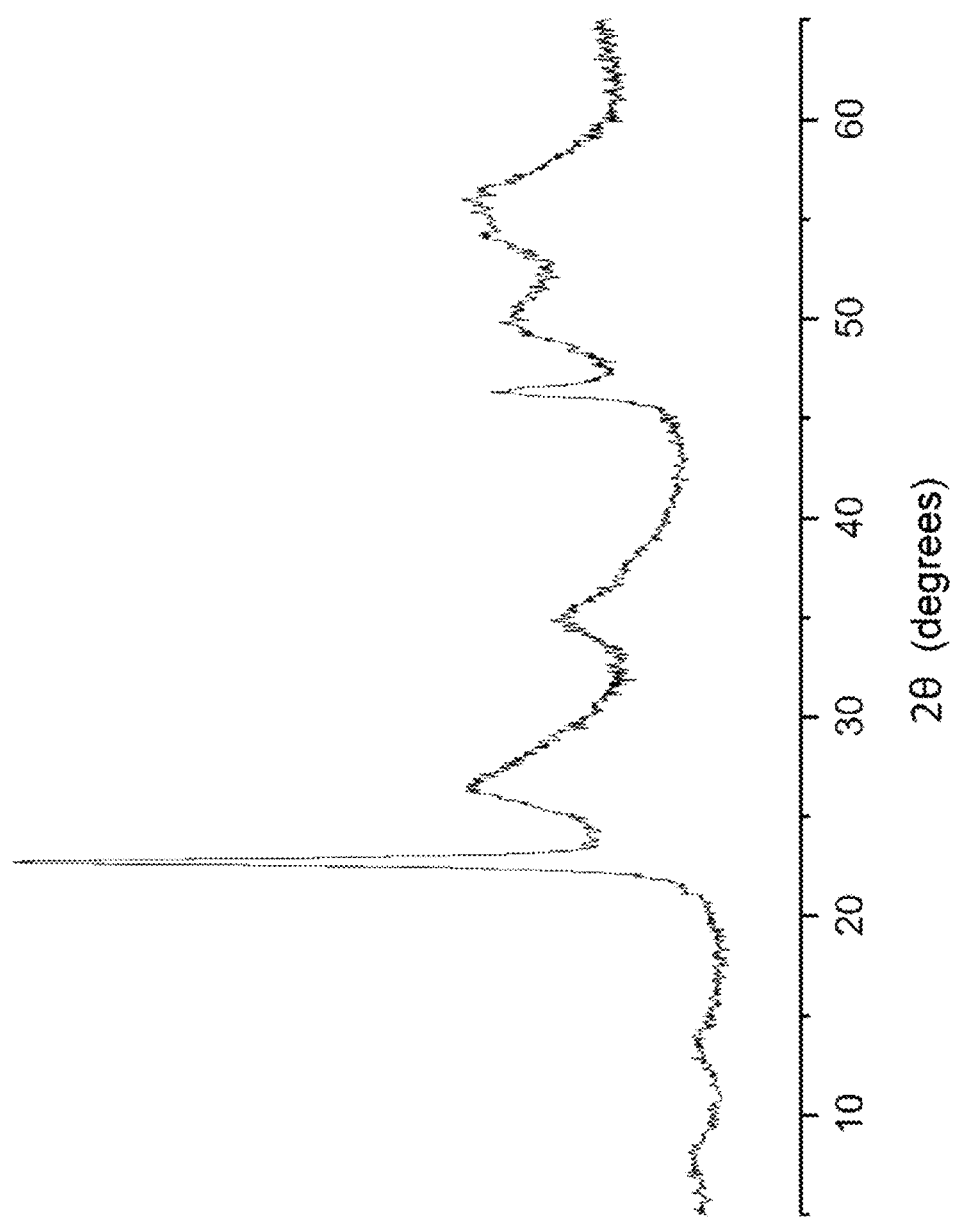
FIG. 8. Shows an X-ray diffractogram of the catalyst based on wolframium and niobium oxides [W—Nb—O (1.0)] described in Example 8.

25.87 g of ammonium metawolframate and 1.90 g of 96% sulfuric acid are added to 134.5 g of water at 80° C. Furthermore, and after heating at 80° C., a solution is prepared with 71.5 g of deionised water and 48.5 g of niobium oxalate, which is added to the previous solution. The resulting mixture is transferred to a Teflon-lined steel autoclave. The autoclave is maintained at 175° C., in static mode, for 2 days and the solid obtained is dried at 100° C. for 16 hours. Lastly, the material is heated at 300° C. for 2 hours under a nitrogen flow. This catalyst is characterised by the fact that it presents an X-ray diffractogram such as that shown in FIG. 8.

Example 9. Preparation of a Catalyst Using the Hydrothermal Method, Based on Wolframium and Niobium Oxides with a W/Nb Molar Ratio=1.0 [W—Nb—O (1.0)] and Treated in Nitrogen at 800° C.

Figure 9:
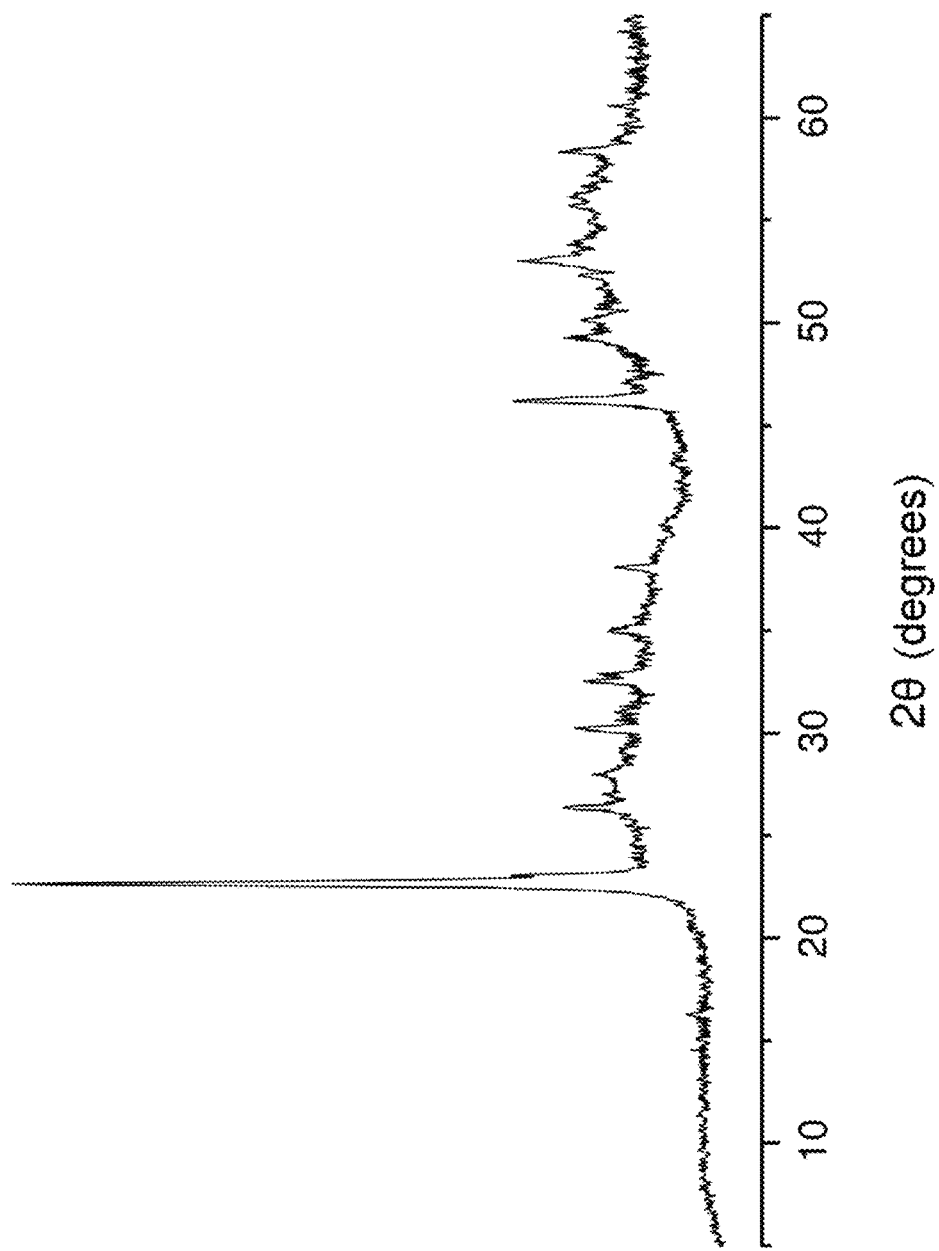
FIG. 9. Shows an X-ray diffractogram of the catalyst based on wolframium and niobium oxides [W—Nb—O (1.0)] described in Example 9.

25.87 g of ammonium metawolframate and 1.90 g of 96% sulfuric acid are added to 134.5 g of water at 80° C. Furthermore, and after heating at 80° C., a solution is prepared with 71.5 g of deionised water and 48.5 g of niobium oxalate, which is added to the previous solution. The resulting mixture is transferred to a Teflon-lined steel autoclave. The autoclave is maintained at 175° C., in static mode, for 2 days and the solid obtained is dried at 100° C. for 16 hours. Lastly, the material is heated at 800° C. for 2 hours under a nitrogen flow. This catalyst is characterised by the fact that it presents an X-ray diffractogram such as that shown in FIG. 9.

Figure 10:
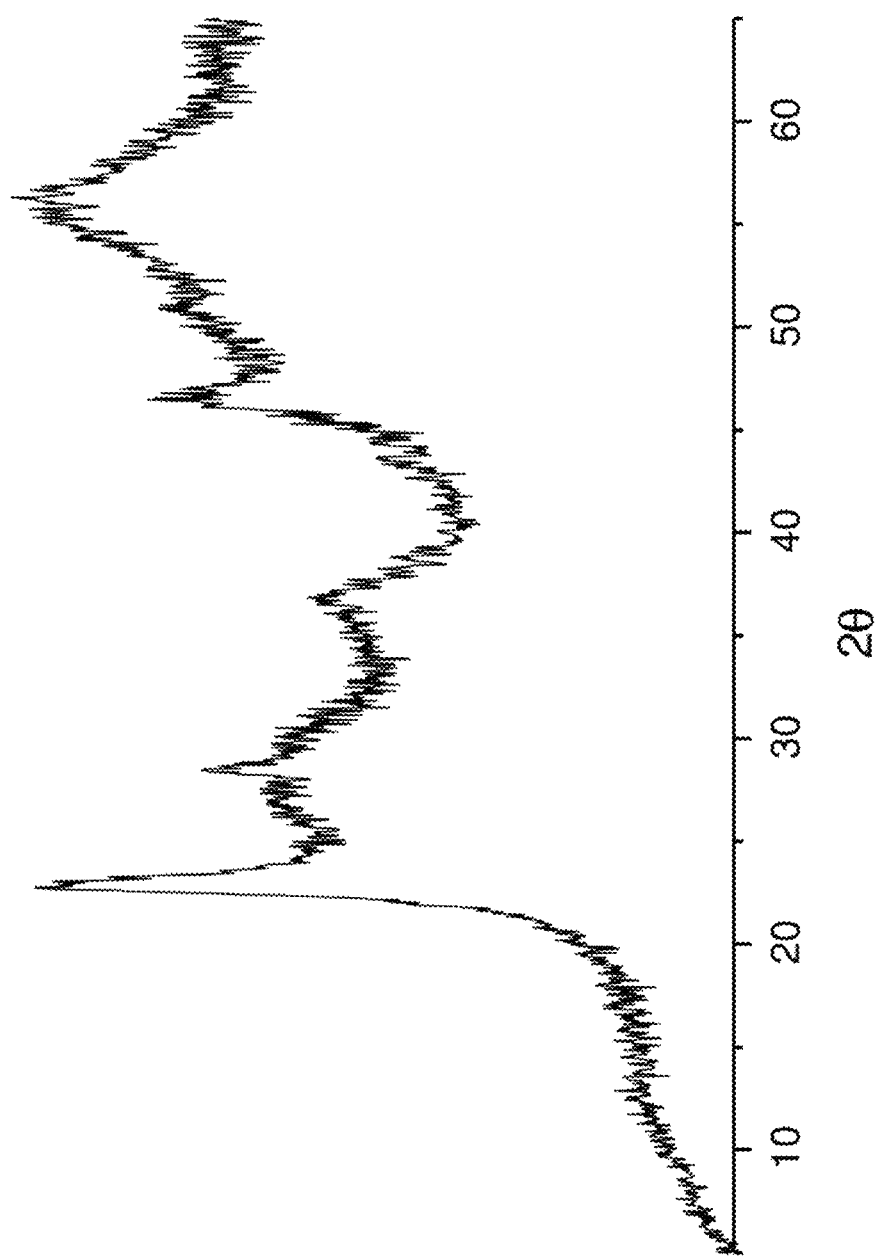
FIG. 10. Shows an X-ray diffractogram of the catalyst based on niobium oxide [Nb—O hydrot.] described in Example 10.

Example 10. Preparation of a Catalyst by the Hydrothermal Method, Based on Niobium Oxide [Nb—O Hydrot.] and Treated in Nitrogen 30.6 g of niobium oxalate are dissolved in 63.2 g of deionised water at 80° C. and stirred. Stirring is maintained for 10 minutes. The mixture is transferred to a Teflon-lined steel autoclave. The autoclave is maintained at 175° C. in static mode for 2 days and the solid obtained is treated at 100° C. for 16 hours. Lastly, the material is heated at 550° C. for 2 hours under a nitrogen flow. This catalyst is characterised by the fact that it presents an X-ray diffractogram such as that shown in FIG. 10.

Figure 11:
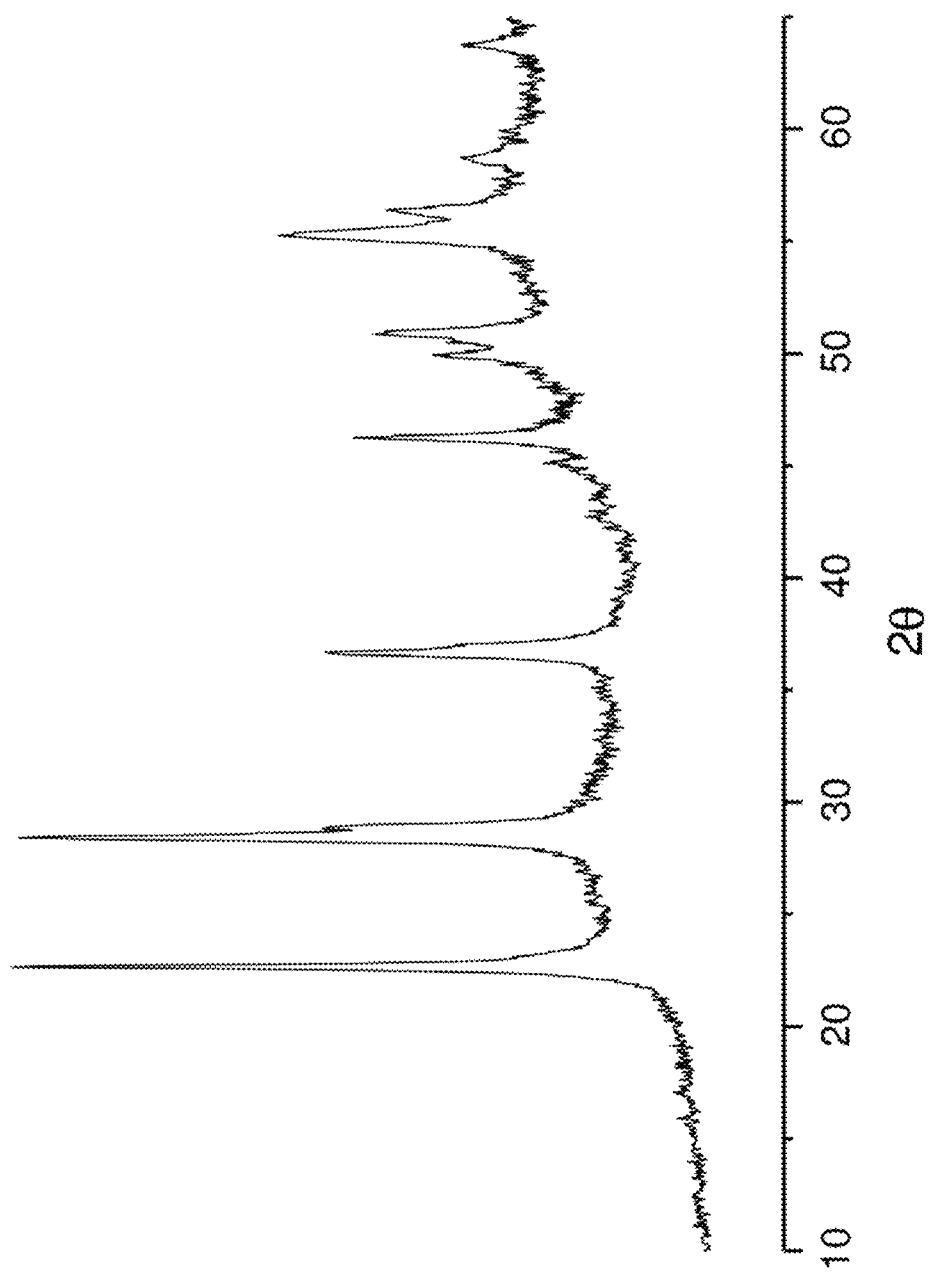
FIG. 11. Shows an X-ray diffractogram of the catalyst based on niobium oxide [Nb—O hydrot.] described in Example 11.

Example 11. Preparation of a Catalyst Similar to that of Example 10, but Thermally Activated in Air 30.6 g of niobium oxalate are dissolved in 63.2 g of deionised water at 80° C. and stirred. Stirring is maintained for 10 minutes. The mixture is transferred to a Teflon-lined steel autoclave. The autoclave is maintained at 175° C. in static mode for 2 days and the solid obtained is treated at 100° C. for 16 hours. Lastly, the material is heated at 550° C. for 2 hours under a nitrogen flow. This catalyst is characterised by the fact that it presents an X-ray diffractogram such as that shown in FIG. 11.

Example 12. Preparation of a Catalyst Based on Mixed Ce and Zr Oxides [Ce—Zr—O] Using the Co-Precipitation Method This catalyst is synthesised to illustrate catalysts of the mixed Ce—Zr type commonly used in literature for this type of condensation reactions [A. Gangadharan et al., *Appl. CataL A: Gral.*, 385 (2010) 80]. Various catalysts were synthesised with different Ce—Zr ratios and the catalyst that provided the best results in terms of yield to organics and conversion was selected for comparison to the catalysts of the present invention.

The catalyst was prepared using the synthesis method by co-precipitation of the mixed Ce—Zr oxide adapting the method published by Serrano-Ruiz et al. [*J. Catal.*, 241 (2006) 45-55].

Figure 12:
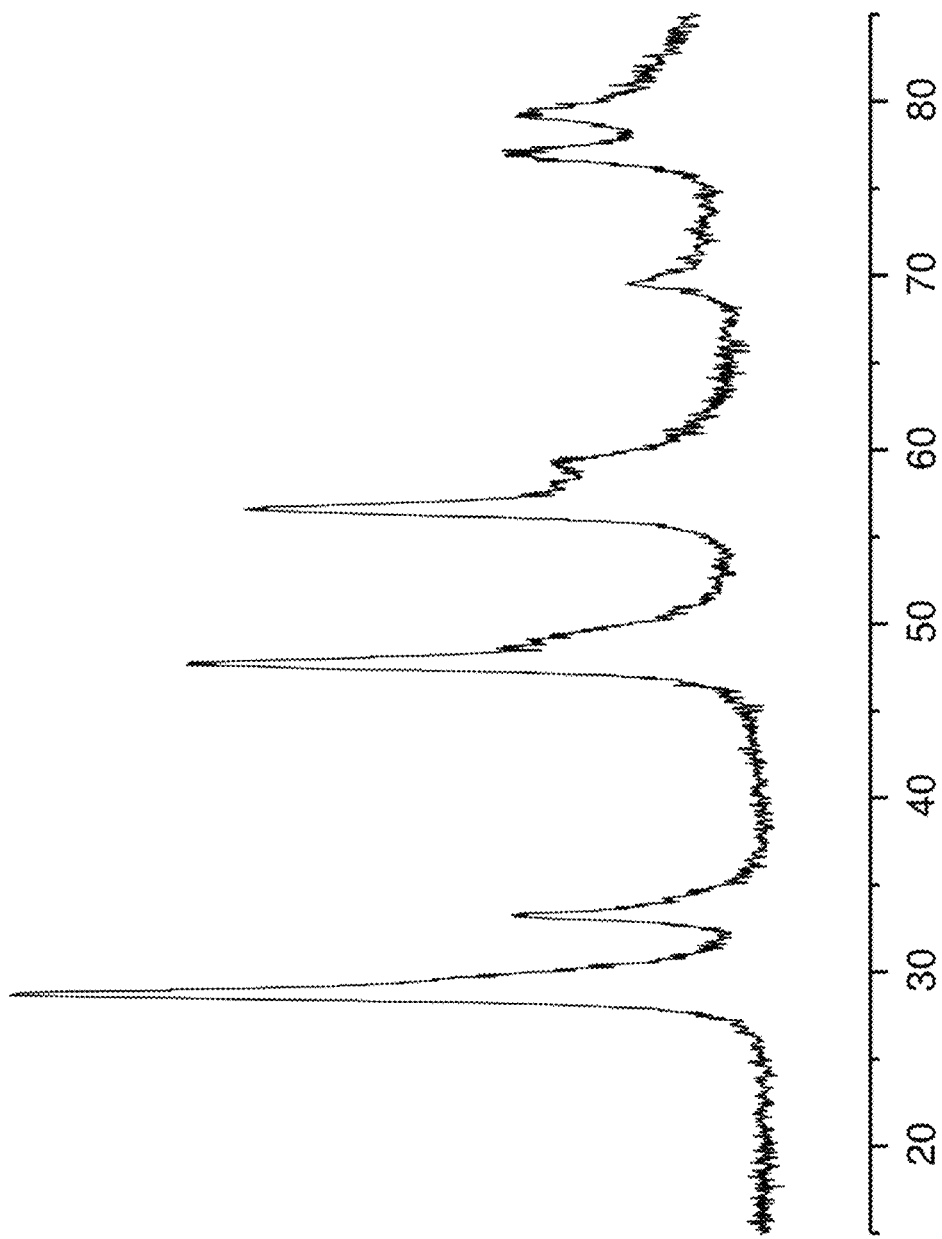
FIG. 12. Shows the X-ray diffractogram obtained for the catalyst based on cerium and zirconium oxides [Ce—Z—O] described in Example 12.

In order to synthesise the catalyst $Ce_{0.5}Zr_{0.5}O_2$, an aqueous solution of the salts of both metals is prepared in an equimolar proportion. $Ce(NO_3)_3 \cdot 6H_2O$ and $ZrO(NO_3)_2 \cdot H_2O$ are used as precursors of both metals. In a beaker, 11.76 g of $Ce(NO_3)_3 \cdot 6H_2O$ and 6.70 g of $ZrO(NO_3)_2 \cdot H_2O$ are weighed and dissolved in 120 ml of distilled water. Next, a solution of 28% $NH_4OH$ is added one drop at a time until reaching a pH of 10. Then, the solution is transferred to a sealed 250 ml cylinder and stirred, wherein the mixture is allowed aging at room temperature for 65 hours. Afterwards, the catalyst is washed with distilled water by means of vacuum filtration until reaching a pH of 7. The catalyst is allowed drying over night at 100° C. and, lastly, is subjected to an activation process by calcination in air at 450° C. for 4.5 hours. The amounts of Ce and Zr measured by ICP match those of the formula $Ce_{0.5}Zr_{0.5}O_2$, and the X-ray diffractogram obtained for this sample indicates the presence of mixed Ce and Zr oxides (FIG. 12)

Example 13. Preparation of a Catalyst Based on Mixed W and Nb Oxides [W—Nb—O Impreg.] Using the Wet Impregnation Method This catalyst is synthesised to illustrate catalysts of the mixed W—Nb type commonly used in literature [C. Yue et al., *Appl. Catal. B: Environ.*, 163 (2015) 370-381]. A catalyst of the mixed oxide type is synthesised with a W—Nb ratio similar to that used for the catalyst of Example 6, in order to be compared in terms of catalytic activity with the catalysts of the present invention.

The catalyst was prepared using the synthesis method by wet impregnation of the mixed Ce—Zr oxide adapting the method published by C. Yue et al. [*Appl. Catal. B: Environ.*, 163 (2015) 370-381].

Figure 13:
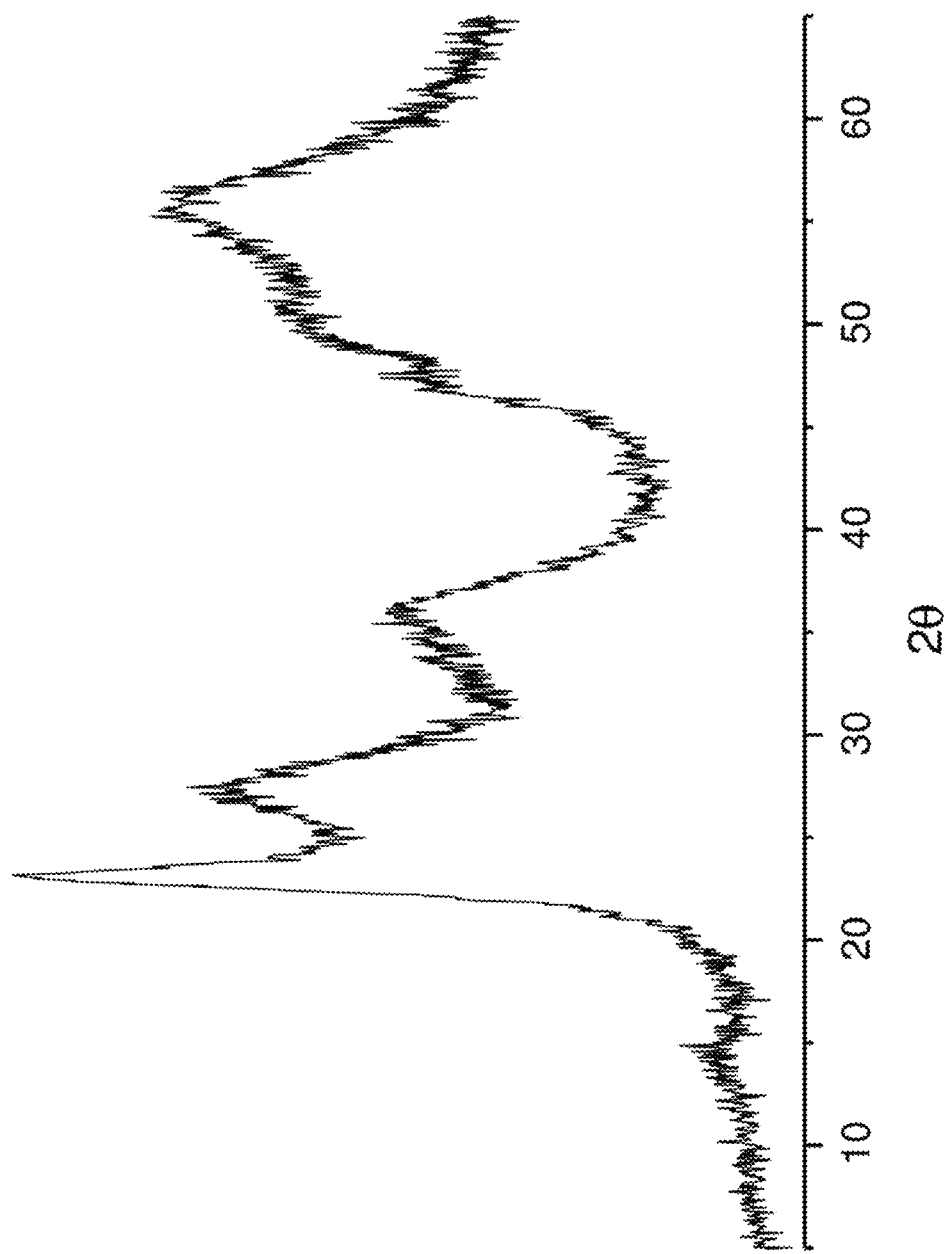
FIG. 13. Shows the X-ray diffractogram obtained for the catalyst based on wolframium and niobium oxides [W—Nb—O impreg.] described in Example 13.

In order to synthesise the catalyst $W_{12}Nb_{6.5}O_x$, an aqueous solution of the salts of the two metals is prepared in the desired proportion. $(NH_4)_6H_2W_{12}O_{40} \cdot H_2O$ and $C_4H_4NNbO_9 \cdot H_2O$ are used as precursors of both metals. In a beaker, 3.84 g of $(NH_4)_6H_2W_{12}O_{40} \cdot H_2O$ and 2.36 g of $C_4H_4NNbO_9 \cdot H_2O$ are weighed and dissolved in 15 ml of distilled water. The mixture is stirred at a temperature of 70° C. and the solvent is slowly evaporated. After 10 hours drying at a temperature of 100° C., the catalyst is subjected to an activation process by calcination in air at 450° C. for 3.5 hours. The X-ray diffractogram obtained for this sample indicates the presence of mixed W and Nb oxides (FIG. 13)

Example 14. Preparation of a Catalyst Based on Mixed W and Nb Oxides [W—Nb—O Co-Precip.] Using the Co-Precipitation Method This catalyst is synthesised to illustrate catalysts of the mixed W—Nb type commonly used in literature [D. Stosic et al., *Catal. Today*, 192 (2012) 160-168]. A catalyst of the mixed oxide type is synthesised with a W—Nb ratio similar to that used for the catalyst of Example 6, in order to be compared in terms of catalytic activity with the catalysts of the present invention.

In this case, a method similar to that used in the preparation of a catalyst of the Ce—Zr mixed oxide type (Example 11) to prepare a mixed W—Nb oxide using the co-precipitation method. To this end, the synthesis method published by D. Stosic et al. [*Catal. Today*, 192 (2012) 160-168] is adapted.

In order to synthesise the catalyst $W_{12}Nb_{18}O_x$, an aqueous solution of the salts of the two metals is prepared in the desired proportion. $(NH_4)_6H_2W_{12}O_{40} \cdot H_2O$ and $C_4H_4NNbO_9 \cdot H_2O$ are used as precursors of both metals. In a beaker, 2.96 g of $(NH_4)_6H_2W_{12}O_{40} \cdot H_2O$ and 5.4536 g of $C_4H_4NNbO_9 \cdot H_2O$ are weighed and dissolved in 50 ml of distilled water. Next, a solution of 28% $NH_4OH$ is added one drop at a time until reaching a pH of 9. Then, the mixture is allowed aging at room temperature for 24 hours. Next, the catalyst is washed with distilled water by means of vacuum filtration until reaching a pH of 7.

Figure 14:
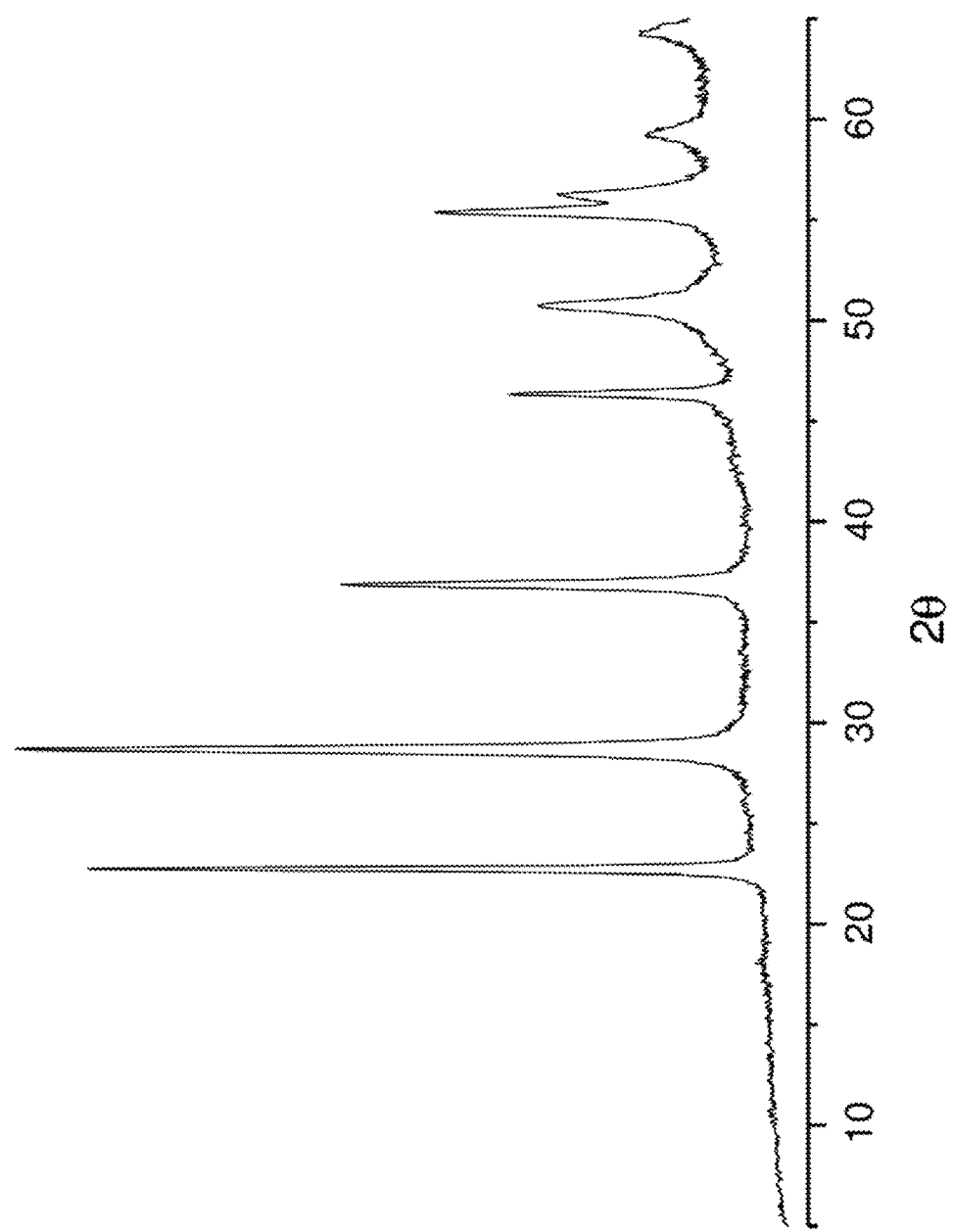
FIG. 14. Shows the X-ray diffractogram obtained for the catalyst based on wolframium and niobium oxides [W—Nb—O co-precip.] described in Example 14.

The catalyst is allowed drying over night at 100° C. and, lastly, is subjected to an activation process by calcination in nitrogen at 550° C. for 5 hours. The X-ray diffractogram obtained for this sample indicates the presence of mixed W and Nb oxides (FIG. 14)

Figure 15:
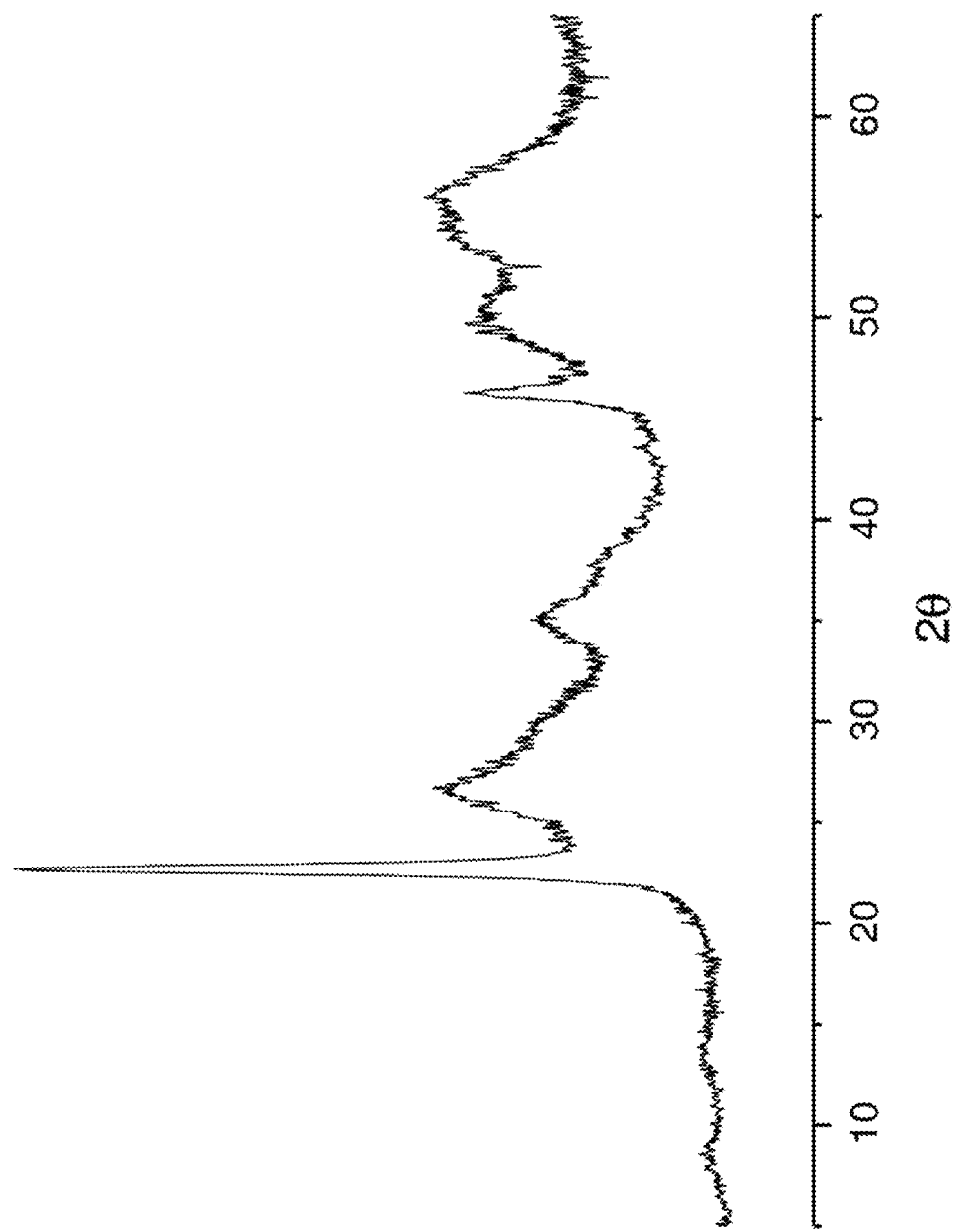
FIG. 15. Shows an X-ray diffractogram of the catalyst based on wolframium, niobium and potassium oxides [W—Nb—K—O] described in Example 15.

Example 15: Modification of the Catalyst of Example 6 by Treatment with Potassium Salt A solution of 0.13 g of potassium bicarbonate is prepared in 100 g of water to which 8.0 g of the catalyst obtained in Example 6 is added. The mixture is stirred at room temperature for 4 hours. Next, the solid is separated from the solution and treated at 280° C. for 2 hours under an air flow. This catalyst is characterised by the fact that it presents an X-ray diffractogram such as that shown in FIG. 15.

Figure 16:
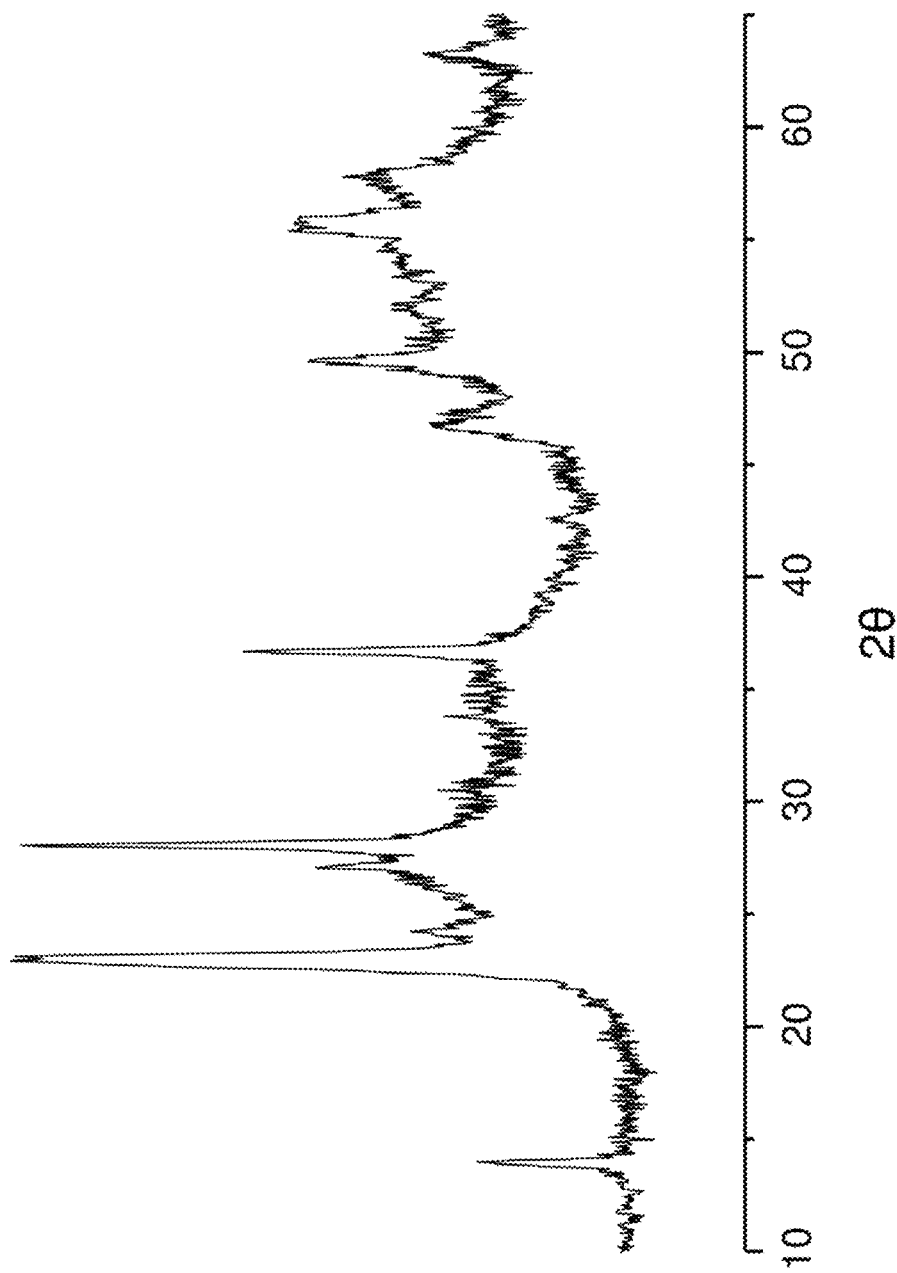
FIG. 16. Shows an X-ray diffractogram of the catalyst based on wolframium, niobium and vanadium oxides [W—Nb—V—O (V/W=0.33)] described in Example 16.

Example 16. Preparation of a Catalyst Based on Mixed W—V—Nb—O Oxide with a V/W Molar Ratio=0.33 Using the Hydrothermal Method and Thermally Treated in Nitrogen 31.0 g of ammonium metawolframate and 3.0 g of 37% hydrochloric acid are added to 163.5 g of water, and the mixture is heated at 80° C. and stirred for 30 minutes. Simultaneously, a solution of 13.7 g of vanadyl sulphate is prepared in 62.1 g of water at room temperature, which is slowly added to the first. Next, a solution of 12.0 g of niobium oxalate is prepared in 29.1 g of water at 80° C., which is slowly added to the previous mixture. The resulting mixture is transferred to a Teflon-lined steel autoclave. The autoclave is maintained at 175° C., in static mode for 2 days and the solid obtained is treated at 100° C. for 16 hours. Lastly, the material is heated at 550° C. for 2 hours under a nitrogen flow. This catalyst is characterised by the fact that it presents an X-ray diffractogram such as that shown in FIG. 16.

Figure 17:
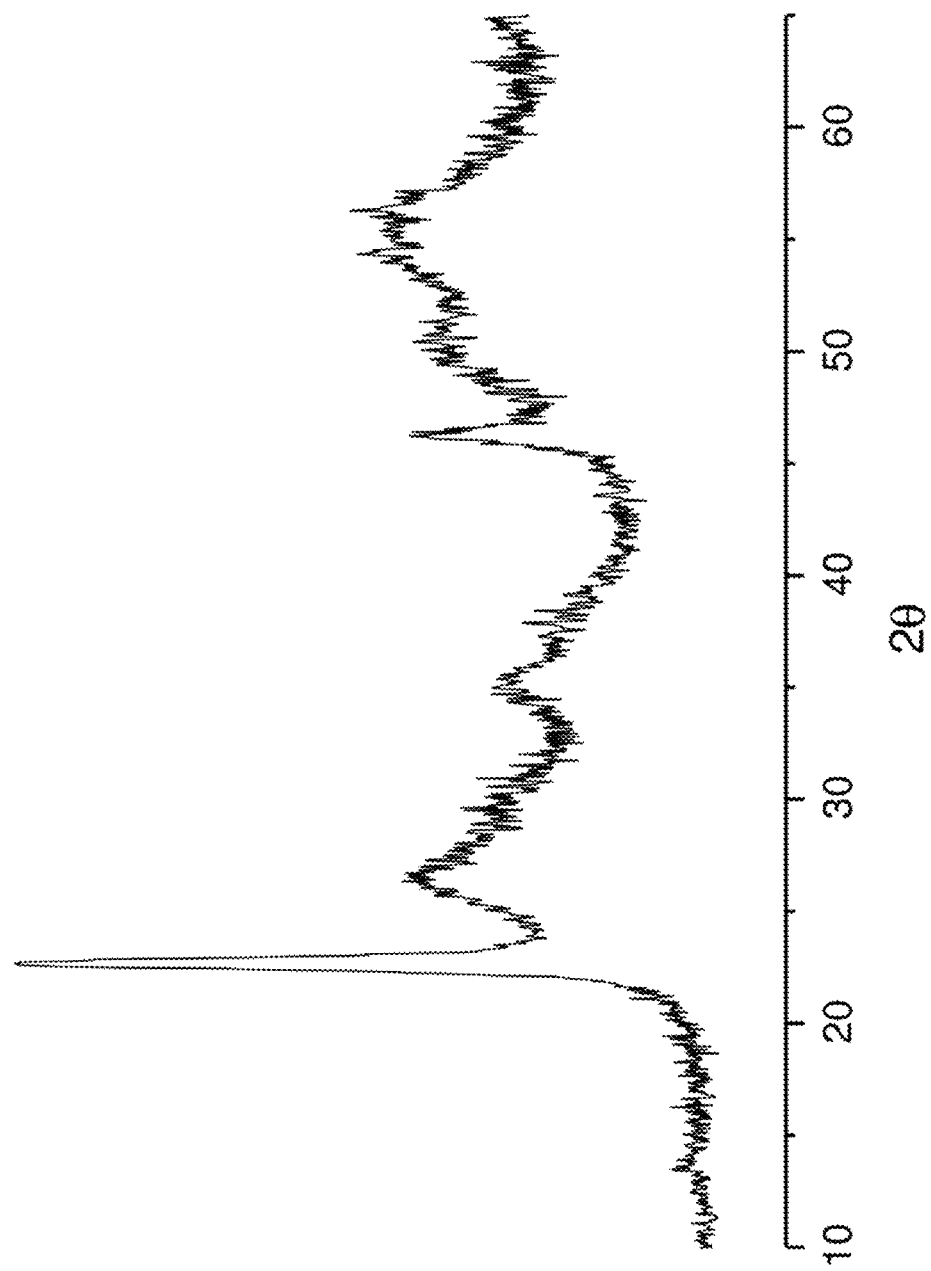
FIG. 17. Shows an X-ray diffractogram of the catalyst based on wolframium, niobium and vanadium oxides [W—Nb—V—O (V/W=0.17)] described in Example 17.

Example 17. Preparation of a Catalyst Similar to that of Example 15, with a Lower V/W Molar Ratio (V/W=0.17) and Thermally Treated in Nitrogen 12.9 g of ammonium wolframate and 1.29 g of 98% sulfuric acid are added to 68.1 g of water, and the mixture is maintained at 80° C. and stirred for 30 minutes. Simultaneously, a solution of 6.7 g of vanadyl sulphate is prepared in 30.1 g of water, which is added to the first. Next, a solution of 37.5 g of niobium oxalate is prepared in 90.4 g of water at 80° C., which is slowly added to the previous mixture. The resulting mixture is transferred to a Teflon-lined steel autoclave. The autoclave is maintained at 175° C., in static mode for 2 days and the solid obtained is treated at 100° C. for 16 hours. Lastly, the material is heated at 550° C. for 2 hours under a nitrogen flow. This catalyst is characterised by the fact that it presents an X-ray diffractogram such as that shown in FIG. 17.

Figure 18:
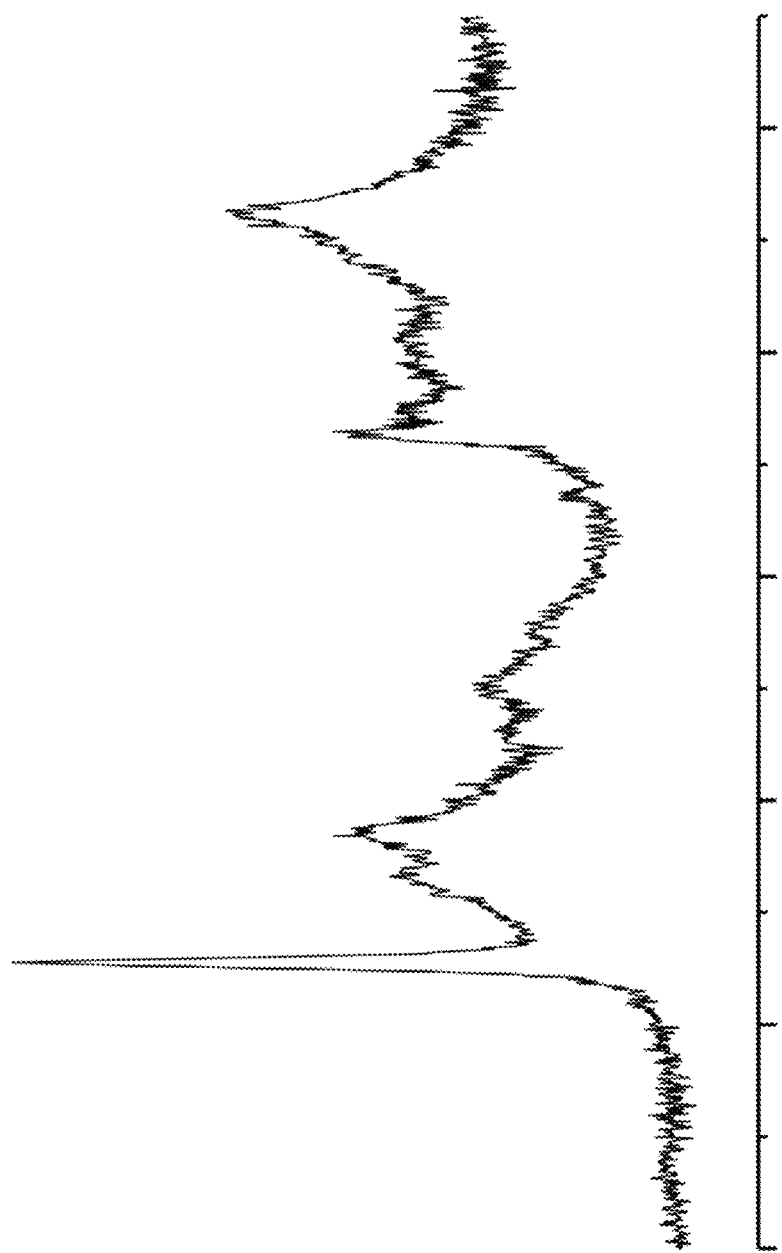
FIG. 18. Shows an X-ray diffractogram of the catalyst based on wolframium, niobium and cerium oxides [W—Nb—Ce—O] described in Example 18.

Example 18. Preparation of a Catalyst Based on Mixed W—Ce—Nb—O Oxide Using the Hydrothermal Method and Thermally Treated in Nitrogen 7.0 g of ammonium metawolframate, 5.4 g of cerium trichloride and 0.52 g of 37% hydrochloric acid are added to 54.1 g of water at 80° C., which is stirred for 30 minutes. Simultaneously, a solution of 28.7 g of niobium oxalate is prepared in 29.4 g of water at 80° C., which is slowly added to the first, stirring for 10 minutes. The resulting mixture is transferred to a Teflon-lined steel autoclave. The autoclave is maintained at 175° C., in static mode for 2 days and the solid obtained is treated at 100° C. for 16 hours. Lastly, the material is heated at 550° C. for 2 hours under a nitrogen flow. This catalyst is characterised by the fact that it presents an X-ray diffractogram such as that shown in FIG. 18.

Figure 19:
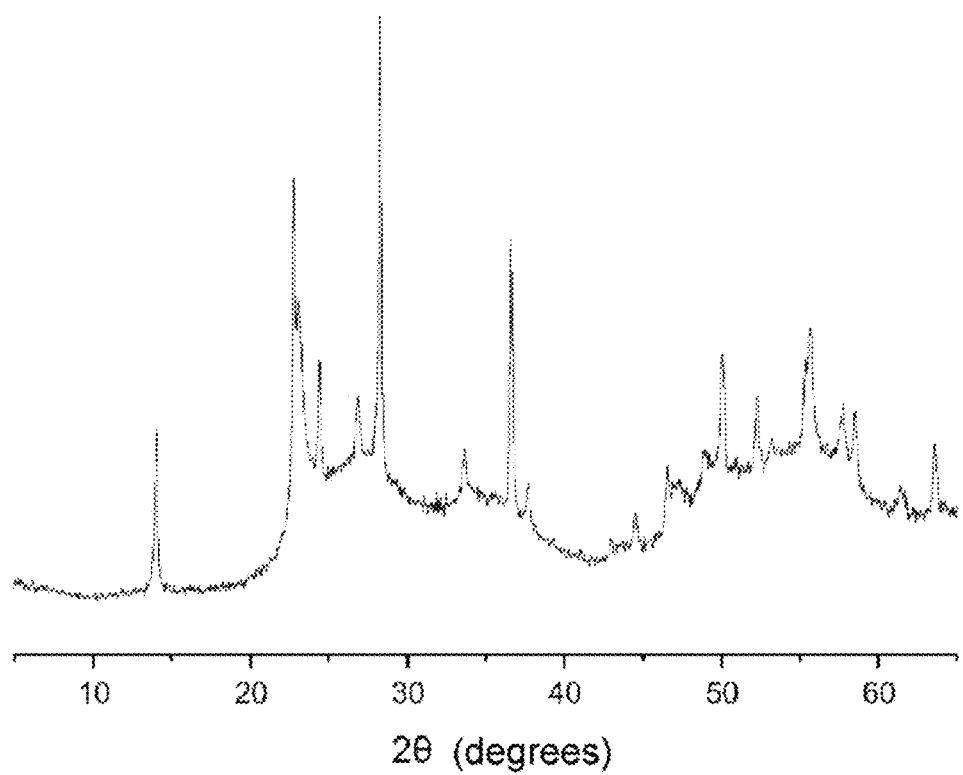
FIG. 19. Shows an X-ray diffractogram of the catalyst based on wolframium and zirconium oxides [W—Zr—O] described in Example 19.

Example 19. Preparation of a Catalyst Based on Wolframium and Zirconium Oxides [W—Zr—O] Using the Hydrothermal Method and Thermally Treated in Nitrogen 20.4 g of ammonium metawolframate, 1.28 g of oxalic acid and 1.75 g of 37% hydrochloric acid are added to 105.7 g of water at 80° C. and stirred for 30 minutes. Simultaneously, a solution of 8.9 g of zirconium chloride is prepared in 31.0 g of water, which is slowly added to the first. The resulting mixture is transferred to a Teflon-lined steel autoclave. The autoclave is maintained at 175° C., in static mode, for 2 days. The solid obtained is treated at 100° C. for 16 hours and finally heated at 450° C. for 2 hours under a nitrogen flow. This catalyst is characterised by the fact that it presents an X-ray diffractogram such as that shown in FIG. 19.

Example 20. Comparative Catalytic Activity of the Catalysts of the W—Nb Series of Examples 1, 3, 6, 7 and 10

The catalytic activity experiments are carried out in the liquid phase using 12 ml stainless steel autoclave-type reactors with PEEK (polyether ether ketone) reinforced interior and equipped with a magnetic stirrer, pressure gauge and gas and liquid sample input/output valve. The reactors are disposed on a steel-lined individual support with closed-loop temperature control.

The initial feed consists of a model aqueous mixture containing oxygenated compounds simulating the residual aqueous flows obtained after a phase separation process, subsequent to biomass pyrolysis. The composition of the model aqueous mixture is detailed below (Table 1):

TABLE 1

| Composition of the model aqueous mixture used as initial feed in the autoclave-type reactor. ||
|---|---|
| Component | Content (wt %) |
| Water | 30 |
| Propionaldehyde | 25 |
| Hydroxy-acetone | 5 |
| Acetic acid | 30 |
| Ethanol | 10 |

3,000 mg of model aqueous mixture and 150 mg of one of the catalytic materials of Examples 1-xx were introduced in the previously described autoclave reactor. The reactor was hermetically sealed, initially pressurized with 13 bar of $N_2$, and heated to 220° C. under continuous stirring. Liquid samples were taken (≈50-100 µl) at different time intervals up to 7 hours of reaction. The samples were filtered and diluted in a standard solution of 2 wt % chlorobenzene in methanol and analysed by means of gas chromatography in a GC-Bruker 430 equipped with a FID detector and a TRB-624 capillary column of 60 m. The identification of the products was carried out using an Agilent 6890N gas chromatograph coupled to an Agilent 5973N (GC-MS) mass detector and equipped with a HP-5MS 30 m capillary column.

The quantification of the products was carried out based on the response factors calculated using an internal standard (solution of 2 wt % chlorobenzene in methanol) and species with more than 5 carbon atoms are classified and quantified in intervals, whose response factors were calculated based on molecules representative thereof. In addition to the main primary condensation reaction products, such as acetone, ethyl acetate, 3-pentanone and 2-methyl-2-pentenal, groups of molecules containing 5, 6, 7, 8, 9, 10 or more than 10 carbon atoms can be distinguished. In order to simplify the quantification of these reaction products, these molecules are grouped into two major groups of compounds, namely: C5-C8 Products and C9-C10+ Products.

In the illustrated Examples of catalytic activity, the following parameters are used to analyse the results obtained:

The conversion (in molar percentage) for each of the oxygenated compounds contained in the model aqueous mixture, is calculated using the following formula:

Conversion (%)=(initial moles of oxygenated comp.− final moles of oxygenated comp./initial moles of oxygenated comp.)*100

The final yield (as a percentage by weight) to each of the products obtained, is calculated using the following formula:

Product yield (%)=grams of product, in the reactor/total grams in the reactor

Yield to Total Organics (as a percentage by weight), is calculated using the following formula:

Total Organics (%)=($Yield_{Acetone}$+$Yield_{3-pentanone}$+ $Yield_{2-methyl-2-pentenal}$+$Yield_{C5-C8}$+$Yield_{C9-C10+}$)

In this manner, the following results were obtained for the catalytic activity experiments with the catalysts based on W and Nb of Examples 1, 3, 6, 7 and 10:

TABLE 2

Catalytic activity in the conversion of oxygenated compounds contained in a model aqueous mixture of catalysts based on W and/or NB of Examples 1, 3, 6, 7 and 10.

|  |  | Example | | | | |
|---|---|---|---|---|---|---|
|  |  | 1 | 3 | 6 | 7 | 10 |
|  |  | Catalyst | | | | |
|  |  | W—O | W—Nb—O (1.8) | W—Nb—O (0.7) | W—Nb—O (0.3) | Nb—O hydrot. |
| Conversion (%) | Acetic acid | 0.00% | 8.04% | 9.76% | 10.14% | 9.99% |
|  | Propionaldehyde | 86.57% | 90.13% | 89.02% | 91.03% | 92.34% |
|  | Ethanol | 49.83% | 47.11% | 51.30% | 52.79% | 57.57% |
|  | Hydroxy-acetone | 100.00% | 100.00% | 100.00% | 100.00% | 100.00% |
| Final Yield (%) | Acetone | 0.22% | 0.06% | 0.06% | 0.15% | 0.37% |
|  | Ethyl acetate | 6.69% | 7.08% | 5.75% | 6.15% | 5.00% |
|  | 3-pentanone | 0.18% | 0.18% | 0.18% | 0.16% | 0.19% |
|  | 2-methyl-2-pentenal | 8.78% | 8.81% | 10.67% | 10.61% | 11.57% |
|  | C5-C8 | 3.32% | 3.92% | 3.31% | 2.57% | 2.76% |
|  | C9-C10+ | 3.37% | 4.81% | 5.12% | 5.69% | 5.61% |
|  | Total Organics | 15.87% | 17.78% | 19.34% | 19.18% | 20.50% |

From the comparison shown in Table 2, it can be observed that hydroxy-acetone conversion is in all cases 100%, while the conversion of acetic acid and propionaldehyde increases upon increasing the amount of niobium present in the catalysts used.

Acetone (acetic acid condensation product) is present in the final mixture in amounts smaller than 0.5%, due to the fact that it is a highly reactive compound that can give rise to condensation products of higher molecular weight.

In addition, upon increasing the amount of Nb in the catalysts, the intermediate condensation products (C5-C8) decrease until giving rise to products of higher molecular weight in subsequent condensation stages.

Moreover, the increased conversion of propionaldehyde gives rise to an increase in the amount of 2-methyl-2-pentenal (product of the first self-condensation of propionaldehyde). The condensation products in the C9-C10+ interval and Yield to Total Organics have the same behaviour.

These results show that the combination of W and Nb oxides in the structure of these catalysts produce higher condensation product yields and, in general, higher yield to products in the C9-C10+ range than its analogous W—O catalyst without niobium (Example 1). Additionally, the catalyst Nb—O without wolframium (Example 9) also shows an improved catalytic activity (both in the conversion of oxygenated compounds and in the Yield to Total Organics, >20%), even when there are small amounts of W present in the catalyst (see result with small concentrations of W, catalyst of Example 7). This indicates the existence of an optimum range in the W/Nb ratio (between Examples 6 and 10) in the structure of the catalyst to obtain the maximum yields in the conversion of oxygenated compounds contained in aqueous mixtures derived from biomass.

Example 21. Comparative Catalytic Activity of the Catalysts of the W—Nb Series (Examples 3, 6 and 10) Compared to Conventional W—Nb Oxides (Examples 13 and 14) and Commercial $Nb_2O_5$ (Sigma-Aldrich, CAS 1313-96-8)

3,000 mg of model aqueous mixture and 150 mg of one of the catalytic materials of Examples 3, 6, 10, 13, 14 and of commercial $Nb_2O_5$ were introduced in the previously described autoclave reactor. The reactor was hermetically sealed, initially pressurized with 13 bar of $N_2$, and heated to 220° C. under continuous stirring. Liquid samples were taken (≈50-100 µl) at different time intervals up to 7 hours of reaction. The samples were filtered and diluted in a standard solution of 2 wt % chlorobenzene in methanol and analysed by means of gas chromatography in a GC-Bruker 430 equipped with a FID detector and a TRB-624 capillary column of 60 m. The identification of the products was carried out using an Agilent 6890N gas chromatograph coupled to an Agilent 5973N (GC-MS) mass detector and equipped with a HP-5MS 30 m capillary column.

The following results were obtained:

TABLE 3

Catalytic activity in the conversion of oxygenated compounds contained in a model aqueous mixture of catalysts based on W and/or Nb, hydrothermally prepared, Examples 3, 6 and 10, compared to the results obtained with other catalysts based on W—Nb prepared using more conventional methods (Examples 13 and 14) or with commercial $Nb_2O_5$.

|  |  | Example | | | | | |
|---|---|---|---|---|---|---|---|
|  |  | 13 | 3 | 14 | 6 | — | 10 |
|  |  | Catalyst | | | | | |
|  |  | W—Nb impreg. | W—Nb—O (1.8) | W—Nb—O co-precip. | W—Nb—O (0.7) | commercial $Nb_2O_5$ | Nb—O hydrot. |
| Conversion (%) | Acetic acid | 11.13% | 8.04% | 13.04% | 9.76% | 8.66% | 9.99% |
|  | Propionaldehyde | 72.86% | 90.13% | 71.69% | 89.02% | 76.36% | 92.34% |

TABLE 3-continued

Catalytic activity in the conversion of oxygenated compounds contained in a model aqueous mixture of catalysts based on W and/or Nb, hydrothermally prepared, Examples 3, 6 and 10, compared to the results obtained with other catalysts based on W—Nb prepared using more conventional methods (Examples 13 and 14) or with commercial $Nb_2O_5$.

| | | Example | | | | | |
|---|---|---|---|---|---|---|---|
| | | 13 | 3 | 14 | 6 | — | 10 |
| | | Catalyst | | | | | |
| | | W—Nb impreg. | W—Nb—O (1.8) | W—Nb—O co-precip. | W—Nb—O (0.7) | commercial $Nb_2O_5$ | Nb—O hydrot. |
| Final Yield (%) | Ethanol | 51.63% | 47.11% | 46.46% | 51.30% | 53.47% | 57.57% |
| | Hydroxy-acetone | 100.00% | 100.00% | 100.00% | 100.00% | 100.00% | 100.00% |
| | Acetone | 0.25% | 0.06% | 0.20% | 0.06% | 0.40% | 0.37% |
| | Ethyl acetate | 6.51% | 7.08% | 7.01% | 5.75% | 6.15% | 5.00% |
| | 3-pentanone | 0.14% | 0.18% | 0.20% | 0.18% | 0.13% | 0.19% |
| | 2-methyl-2-pentenal | 7.97% | 8.81% | 8.14% | 10.67% | 8.07% | 11.57% |
| | C5-C8 | 3.08% | 3.92% | 3.27% | 3.31% | 1.73% | 2.76% |
| | C9-C10+ | 2.88% | 4.81% | 4.16% | 5.12% | 5.40% | 5.61% |
| | Total Organics | 14.33% | 17.78% | 15.97% | 19.34% | 15.74% | 20.50% |

In Table 3, the catalytic results of the catalysts based on structures containing W—Nb—O and Nb—O, hydrothermally prepared and described earlier (Examples 3, 6 and 10) are compared to other catalysts based on mixed oxides of both metals and prepared using more conventional methods, and whose preparation is described in Examples 13 and 14. A commercial $Nb_2O_5$ catalyst acquired from Sigma-Aldrich, analogously activated prior to use, is also used to compare the Nb—O catalyst without W (Example 10).

From the results shown in Table 3, the total conversion of hydroxy-acetone in all cases is observed, while the conversion of acetic acid is similar in all the cases studied (close to 10-11%).

The conversion of propionaldehyde is the greatest difference between one type of catalysts and others. While catalysts based on combined W—Nb structures have conversions >90%, the commercial niobium catalyst and the mixed oxides prepared in Examples 13 and 14 have much lower conversions (72%-75%). This gives rise to a reduction in the formation of first condensation products such as 2-methyl-2-pentenal and some C5-C8 products, as well as products with higher molecular weight originated by second condensation reactions. In such cases, the Yield to Total Organics is reduced to 14%-16%, which means that the use of catalysts based on specific W—Nb structures such as that of Examples 3, 6 and 10 increases the products obtained in the final mixture of the condensation reaction of oxygenated compounds contained in aqueous mixtures derived from biomass by 25%. Said products are potentially usable as additives in gasoline and refining fractions in general.

These results show that the catalysts of the method of the present invention obtain better results than those obtained using catalysts prepared using conventional methods or commercial materials of similar composition.

Example 22. Comparative Catalytic Activity of the Catalysts of the W—Nb—O Series, Prepared Using the Hydrothermal Method and Treated in Nitrogen at Different Temperatures (Examples 5, 8 and 9)

3,000 mg of model aqueous mixture and 150 mg of one of the catalytic materials of Examples 5, 8 and 9 were introduced in the previously described autoclave reactor. The reactor was hermetically sealed, initially pressurized with 13 bar of $N_2$, and heated to 220° C. under continuous stirring. Liquid samples were taken (≈50-100 µl) at different time intervals up to 7 hours of reaction. The samples were filtered and diluted in a standard solution of 2 wt % chlorobenzene in methanol and analysed by means of gas chromatography in a GC-Bruker 430 equipped with a FID detector and a TRB-624 capillary column of 60 m. The identification of the products was carried out using an Agilent 6890N gas chromatograph coupled to an Agilent 5973N (GC-MS) mass detector and equipped with a HP-5MS 30 m capillary column.

The following results were obtained:

TABLE 4

Catalytic activity in the conversion of oxygenated compounds contained in a model aqueous mixture of catalysts based on W and/or Nb, hydrothermally prepared and treated in nitrogen at different temperatures, Examples 5, 8 and 9.

| | | Example | | |
|---|---|---|---|---|
| | | 9 | 5 | 8 |
| | | Catalyst [Treatment temperature] | | |
| | | W—Nb—O (1.0) [800° C.] | W—Nb—O (1.0) [550° C.] | W—Nb—O (1.0) [300° C.] |
| Conversion (%) | Acetic acid | 8.73% | 9.19% | 5.84% |
| | Propionaldehyde | 83.66% | 90.34% | 94.49% |
| | Ethanol | 43.55% | 55.56% | 52.32% |
| | Hydroxy-acetone | 100.00% | 100.00% | 100.00% |
| Final Yield (%) | Acetone | 0.19% | 0.36% | 0.32% |
| | Ethyl acetate | 7.36% | 4.50% | 5.73% |
| | 3-pentanone | 0.14% | 0.22% | 0.19% |
| | 2-methyl-2-pentenal | 8.90% | 8.96% | 9.90% |
| | C5-C8 | 4.31% | 3.08% | 2.53% |
| | C9-C10+ | 3.55% | 5.00% | 6.36% |
| | Total Organics | 17.09% | 17.62% | 19.30% |

Table 4 shows a comparison of the catalytic results of the previously described catalysts based on structures containing W—Nb—O (with a W/Nb molar ratio=1.0) hydrothermally prepared and then thermally treated under a $N_2$ atmosphere at different temperatures.

From the results shown in Table 4, the total conversion of hydroxy-acetone is observed in all cases, while the conversion of acetic acid is similar in all the catalysts treated at high temperatures, i.e. at 550° C. and 800° C. (Examples 9 and 5, respectively); being slightly lower in the material treated at lower temperature (300° C., Example 8).

However, the distribution of products observed is the greatest difference between these catalysts. Therefore, as the temperature at which the catalysts have been treated decreases (from 800° C. to 500° C., and then 300° C.), a reduction in the production of C5-C8 compounds is observed, from 4.31% to 3.08%, finally reaching 2.57%, respectively. At the same time, an increase in the generation of C9->C10 products is observed, from 3.55% to 5.00% (with treatments at high temperatures), reaching 6.36% (with the treatment at 300° C.). This same upward trend of the observed values is evidenced in the Yields to Total Organics, which increase from 17.09% and 17.62% for the catalysts of Examples 9 and 5, to 19.30% for the catalyst of Example 8. This means that the Yield to Total Organics, and particularly the production of the compound C9->C10, can be controlled and even increased by means of the adequate thermal treatment of the catalysts based on specific W—Nb structures such as that of Examples 5, 8 and 9.

Example 23. Comparative Catalytic Activity of the Catalysts of the W—Nb—O and Nb—O Series, Prepared Using the Hydrothermal Method (Examples 6 and 10), Compared to a Conventional Ce—Zr Catalyst (Example 12)

3,000 mg of model aqueous mixture and 150 mg of one of the catalytic materials of Examples 6, 10 and 12 were introduced in the previously described autoclave reactor. The reactor was hermetically sealed, initially pressurized with 13 bar of $N_2$, and heated to 220° C. under continuous stirring. Liquid samples were taken (≈50-100 µl) at different time intervals up to 7 hours of reaction. The samples were filtered and diluted in a standard solution of 2 wt % chlorobenzene in methanol and analysed by means of gas chromatography in a GC-Bruker 430 equipped with a FID detector and a TRB-624 capillary column of 60 m. The identification of the products was carried out using an Agilent 6890N gas chromatograph coupled to an Agilent 5973N (GC-MS) mass detector and equipped with a HP-5MS 30 m capillary column.

The following results were obtained:

TABLE 5

Comparative catalytic activity of the catalysts based on W and Nb of Examples 6 and 10 in the conversion of oxygenated compounds contained in a model aqueous mixture compared to a conventional Ce—Zr catalyst (Example 12).

| | | Example | | |
|---|---|---|---|---|
| | | 6 | 10 | 12 |
| | | Catalyst | | |
| | | W—Nb—O (0.7) | Nb—O hydrot. | Ce—Zr—O |
| Conversion (%) | Acetic acid | 9.76% | 9.99% | 17.36% |
| | Propionaldehyde | 89.02% | 92.34% | 93.82% |
| | Ethanol | 51.30% | 57.57% | 47.81% |
| | Hydroxyacetone | 100.00% | 100.00% | 100.00% |
| Final Yield (%) | Acetone | 0.06% | 0.37% | 0.21% |
| | Ethyl acetate | 5.75% | 5.00% | 5.81% |
| | 3-pentanone | 0.18% | 0.19% | 0.15% |
| | 2-methyl-2-pentenal | 10.67% | 11.57% | 11.03% |

TABLE 5-continued

Comparative catalytic activity of the catalysts based on W and Nb of Examples 6 and 10 in the conversion of oxygenated compounds contained in a model aqueous mixture compared to a conventional Ce—Zr catalyst (Example 12).

| | Example | | |
|---|---|---|---|
| | 6 | 10 | 12 |
| | Catalyst | | |
| | W—Nb—O (0.7) | Nb—O hydrot. | Ce—Zr—O |
| C5-C8 | 3.31% | 2.76% | 1.61% |
| C9-C10+ | 5.12% | 5.61% | 7.57% |
| Total Organics | 19.34% | 20.50% | 20.56% |

Propionaldehyde and hydroxyacetone conversions are very similar in the catalysts of Examples 6, 10 and 12, while the catalyst of Example 12 has greater conversion of acetic acid and lower conversion of ethanol (results shown in Table 5). However, both the global conversion of reagents and the the Yield to Total Organics observed are very similar in the three examples studied. The only observable difference between the catalysts based on W—Nb oxides (Examples 6 and 10) and mixed Ce—Zr oxide (Example 12) is that the first two have a higher production of organic compounds in the C5-C8 interval, while the mixed oxide prepared in Example 12 is capable of more easily catalysing second condensation reactions, increasing the amount of compounds in the C9-C10+ interval.

In general, catalysts based on structures combining W and Nb obtain results similar to those shown by a catalyst such as $Ce_{0.5}Zr_{0.5}O_2$ traditionally used in literature for this type of reactions.

The catalysts of Examples 6 and 12, once used, are recovered after the reaction, washed with methanol and dried at 100° C. over night. They are then characterised by means of Elemental Analysis (EA) and Thermogravimetry (TG).

The EA study shows that the Ce—Zr-type catalyst of Example 12 presents 3.46 wt % of carbon (organic products deposited in the catalyst) after washing. The catalyst based on W—Nb of Example 6 presents only 1.42 wt % of carbon, demonstrating that a smaller amount of carbonaceous substances are deposited during the reactive process and, therefore, that it is less sensitive to the deactivation caused by the deposition of coke.

These characterisation data are confirmed by the TG analyses. The Ce—Zr-type catalyst of Example 12 presents a mass loss of 11.5% at a temperature close to 300° C. corresponding to the desorption of the organic products absorbed. However, the catalyst of Example 6 presents a mass loss of only 3.5% at said temperature. This catalyst also presents a mass loss of 3.4% at a temperature close to 100° C. corresponding to the water absorbed in the channels of the crystalline structure. This amount of absorbed water is also observed in the TG analysis of the catalyst prior to use, due to which the presence of water in the reaction medium is not detrimental to catalyst activity or stability.

Example 24. Comparative Catalytic Activity During Reuse of the W—Nb—O (0.7) (Example 6) and Ce—Zr—O Catalysts (Example 12)

A series of consecutive reactions were carried out using the catalysts prepared in Examples 6 and 12 to compare their activity after several uses. To this end, the initial reaction (R0) and three subsequent reuses (R1, R2 and R3) were carried out, all of them under the same reaction conditions. The catalysts used are recovered after each reaction, washed with methanol and dried at 100° C. over night. They are then characterised by means of Elemental Analysis (EA) and Thermogravimetry (TG).

In each case (R0, R1, R2 and R3), 3,000 mg of the model aqueous mixture and 150 mg of one of the catalytic materials of Examples 6 and 12 (fresh or used) were introduced in the previously described autoclave reactor. The reactor was hermetically sealed, initially pressurized with 13 bar of $N_2$, and heated to 220° C. under continuous stirring. Liquid samples were taken (≈50-100 μl) at different time intervals up to 7 hours of reaction. The samples were filtered and diluted in a standard solution of 2 wt % chlorobenzene in methanol and analysed by means of gas chromatography in a GC-Bruker 430 equipped with a FID detector and a TRB-624 capillary column of 60 m. The identification of the products was carried out using an Agilent 6890N gas chromatograph coupled to an Agilent 5973N (GC-MS) mass detector and equipped with a HP-5MS 30 m capillary column.

Figure 20:
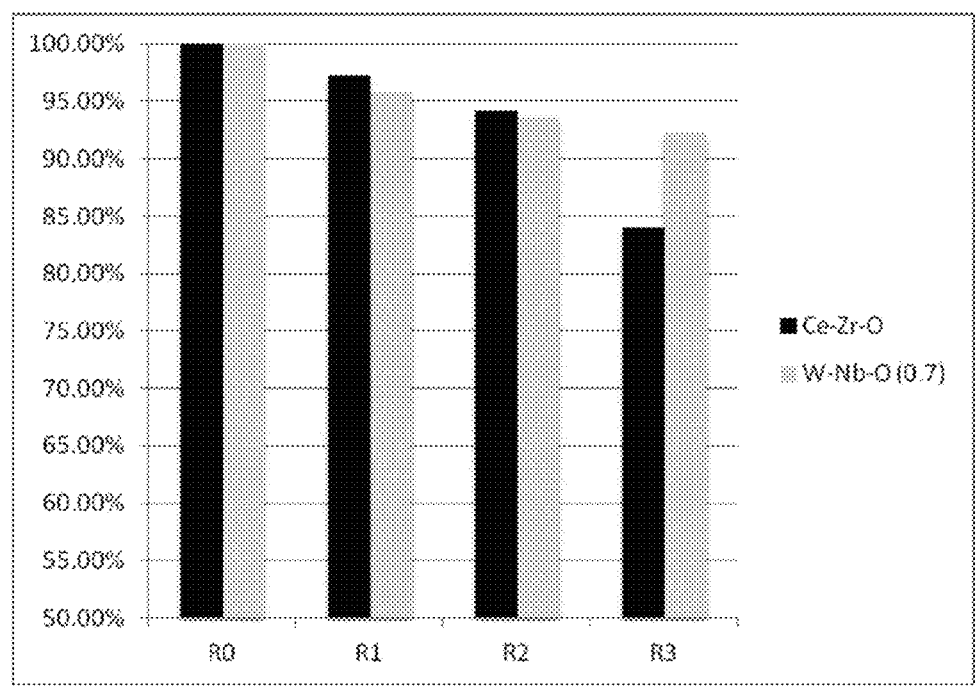
FIG. 20. Shows a comparison of the stability and maintenance of the catalytic activity with the re-uses of the catalysts Ce—Zr—O (Example 12) and W—Nb—O (0.7) (Example 6).

The results obtained are shown in Tables 6 and 7, and in FIG. 20.

TABLE 6

Catalytic activity during reuse of the W—Nb—O catalyst (0.7) of Example 6.

| | | R0 | R1 | R2 | R3 |
|---|---|---|---|---|---|
| Conversion (%) | Acetic acid | 9.76% | 7.56% | 4.92% | 0.00% |
| | Propionaldehyde | 89.02% | 86.12% | 86.44% | 80.37% |
| | Ethanol | 51.30% | 51.10% | 51.26% | 49.12% |
| | Hydroxyacetone | 100.00% | 100.00% | 100.00% | 100.00% |
| Final Yield (%) | Acetone | 0.06% | 0.17% | 0.33% | 0.27% |
| | Ethyl acetate | 5.75% | 6.14% | 6.04% | 6.49% |
| | 3-pentanone | 0.18% | 0.14% | 0.14% | 0.18% |
| | 2-methyl-2-pentenal | 10.67% | 10.00% | 9.83% | 9.25% |
| | C5-C8 | 3.31% | 2.76% | 2.44% | 2.44% |
| | C9-C10+ | 5.12% | 5.45% | 5.37% | 5.70% |
| | Total Organics | 19.34% | 18.52% | 18.10% | 17.84% |

TABLE 7

Catalytic activity during reuse of the Ce—Zr—O catalyst of Example 12.

| | | R0 | R1 | R2 | R3 |
|---|---|---|---|---|---|
| Conversion (%) | Acetic acid | 17.36% | 13.37% | 3.84% | 0.00% |
| | Propionaldehyde | 93.82% | 87.81% | 84.82% | 81.21% |
| | Ethanol | 47.81% | 49.73% | 50.13% | 55.28% |
| | Hydroxyacetone | 100.00% | 100.00% | 100.00% | 100.00% |
| Final Yield (%) | Acetone | 0.21% | 0.20% | 0.09% | 0.11% |
| | Ethyl acetate | 5.81% | 6.05% | 5.99% | 6.27% |
| | 3-pentanone | 0.15% | 0.14% | 0.13% | 0.15% |
| | 2-methyl-2-pentenal | 11.03% | 10.23% | 9.50% | 8.37% |
| | C5-C8 | 1.61% | 1.89% | 2.11% | 2.12% |
| | C9-C10+ | 7.57% | 7.51% | 7.55% | 6.52% |
| | Total Organics | 20.56% | 19.98% | 19.38% | 17.28% |

In both catalysts, the same behaviour can be observed in the conversion of the reagents contained in the initial aqueous mixture. Acetic acid and propionaldehyde conversions decrease with the number of reactions carried out. However, the conversion of ethanol increases in the case of the Ce—Zr—O catalyst (Example 12) and remains constant in the case of the W—Nb—O catalyst (0.7) (Example 6). Consequently, the Yield to Total Organics decreases slightly with the number of reuses in both catalysts, but the drop in percentage is sharper in the case of the Ce—Zr—O catalyst of Example 12, with a percentage loss of catalytic activity with respect to the initial activity of 16%, while the W—Nb—O catalyst prepared in Example 6 has greater stability with a decrease in catalytic activity of only 7.7% (see FIG. 20).

It should be noted that in the case of the Ce—Zr—O catalyst of Example 12, at the end of the reuses only 80 mg of the 150 mg initially added are recovered, while 135 mg are recovered in the case of the W—Nb—O catalyst (0.7) of Example 6. The smaller amount of solid catalyst recovered can be due to a lower stability of the Ce—Zr—O catalyst and to the possible formation of cerium acetate, which causes extraction of cerium oxide from the catalyst structure.

At the same time, the Elementary and Thermogravimetric analyses carried out confirm the greater stability of the W—Nb catalyst of Example 6 compared to the mixed Ce—Zr oxide prepared in Example 12. Therefore, in the W—Nb material (Example 6), only 1.5% by weight of carbon is determined by EA after the third reuse (R3); while the amount of carbon detected in the Ce—Zr catalyst (Example 12) after the same number of reuses reached 4.8 wt %. In addition, it was observed by TG analysis that the W—Nb catalyst (Example 6) suffers a mass loss of 4.0% at temperatures close to 300° C.-350° C. corresponding to absorbed organic products, while the mixed Ce—Zr oxide (Example 12) presents a mass loss of only 9.5% at those temperatures, plus another additional mass loss of 3.3% at temperatures close to 450° C., the latter corresponding to heavier reaction products absorbed in the catalyst.

Example 25. Comparative Catalytic Activity of Catalysts Based on W—Nb—O (Examples 3 and 6) and W—Nb—O with the Addition of an Alkaline Metal, W—Nb—K—O (Example 15)

3,000 mg of model aqueous mixture and 150 mg of one of the catalytic materials of Examples 3, 6 and 15 were introduced in the previously described autoclave reactor. The reactor was hermetically sealed, initially pressurized with 13 bar of $N_2$, and heated to 220° C. under continuous stirring. Liquid samples were taken (≈50-100 μl) at different time intervals up to 7 hours of reaction. The samples were filtered and diluted in a standard solution of 2 wt % chlorobenzene in methanol and analysed by means of gas chromatography in a GC-Bruker 430 equipped with a FID detector and a TRB-624 capillary column of 60 m. The identification of the products was carried out using an Agilent 6890N gas chromatograph coupled to an Agilent 5973N (GC-MS) mass detector and equipped with a HP-5MS 30 m capillary column.

The following results were obtained:

TABLE 8

Comparative catalytic activity for converting oxygenated compounds contained in a model aqueous mixture of catalysts based on W and Nb, of Examples 3, 6 and 15, thermally activated in a nitrogen atmosphere.

| | | Example | | |
|---|---|---|---|---|
| | | 3 | 6 | 15 |
| | | Catalyst | | |
| | | W—Nb—O (1.8) | W—Nb—O (0.7) | W—Nb—K—O |
| Conversion (%) | Acetic acid | 8.04% | 9.76% | 11.45% |
| | Propion-aldehyde | 90.13% | 89.02% | 94.22% |
| | Ethanol | 47.11% | 51.30% | 47.18% |
| | Hydroxy-acetone | 100.00% | 100.00% | 100.00% |
| Final Yield (%) | Acetone | 0.06% | 0.06% | 0.18% |
| | Ethyl acetate | 7.08% | 5.75% | 7.10% |
| | 3-penta-none | 0.18% | 0.18% | 0.16% |
| | 2-methyl-2-pentenal | 8.81% | 10.67% | 11.97% |
| | C5-C8 | 3.92% | 3.31% | 3.20% |
| | C9-C10+ | 4.81% | 5.12% | 4.81% |
| | Total Organics | 17.78% | 19.34% | 20.32% |

From the results of Table 8 it can be inferred that the addition of low concentrations of potassium to the W—Nb—O materials (maintaining a constant W/Nb molar ratio in the composition of the material), generally favours the obtainment of catalytic activities slightly greater than those observed with the W—Nb—O materials of Examples 3 and 6. It should be noted that the presence of K, in these conditions, increases the conversion of acetic acid and the formation of intermediates such as 2-methyl-2-pentenal, maintaining the formation of products in the C5-C8 and C9-C10+ range practically constant, due to which the Yield to Total Organics is slightly increased (>20%) on using this W—Nb—K—O material (Example 15).

Example 26. Comparative Catalytic Activity of Catalysts Based on W—Nb—O (Examples 3 and 6) and W—Nb—V—O, with the Addition of V as a Third Metallic Element (Examples 16 and 17)

3,000 mg of model aqueous mixture and 150 mg of one of the catalytic materials of Examples 3, 6, 16 and 17 were introduced in the previously described autoclave reactor. The reactor was hermetically sealed, initially pressurized with 13 bar of $N_2$, and heated to 220° C. under continuous stirring. Liquid samples were taken (≈50-100 µl) at different time intervals up to 7 hours of reaction. The samples were filtered and diluted in a standard solution of 2 wt % chlorobenzene in methanol and analysed by means of gas chromatography in a GC-Bruker 430 equipped with a FID detector and a TRB-624 capillary column of 60 m. The identification of the products was carried out using an Agilent 6890N gas chromatograph coupled to an Agilent 5973N (GC-MS) mass detector and equipped with a HP-5MS 30 m capillary column.

The results obtained using catalysts based on W—Nb to which a certain amount of vanadium was added (Examples 16 and 17) are shown below, and the results are compared to W—Nb catalysts of similar composition:

TABLE 9

Catalytic activity in the conversion of oxygenated compounds contained in a model aqueous mixture of catalysts based on W and Nb of Examples 3 and 6 compared to the results of W—Nb—V—O catalysts (Examples 16 and 17).

| | | Example | | | |
|---|---|---|---|---|---|
| | | 15 | 3 | 16 | 6 |
| | | Catalyst | | | |
| | | W—Nb—V—O (V/W = 0.33) | W—Nb—O (1.8) | W—Nb—V—O (V/W = 0.17) | W—Nb—O (0.7) |
| Conv. (%) | Acetic acid | 12.18% | 8.04% | 7.88% | 9.76% |
| | Propionaldehyde | 81.60% | 86.31% | 90.38% | 89.02% |
| | Ethanol | 48.57% | 47.11% | 45.31% | 51.30% |
| | Hydroxyacetone | 100.00% | 100.00% | 100.00% | 100.00% |
| Final Yield (%) | Acetone | 0.14% | 0.06% | 0.42% | 0.42% |
| | Ethyl acetate | 6.46% | 7.08% | 6.63% | 5.75% |
| | 3-pentanone | 0.17% | 0.18% | 0.20% | 0.18% |
| | 2-methyl-2-pentenal | 9.77% | 8.81% | 10.69% | 10.67% |
| | C5-C8 | 2.80% | 3.92% | 2.77% | 3.31% |
| | C9-C10+ | 4.30% | 4.81% | 4.89% | 5.12% |
| | Total Organics | 17.28% | 17.77% | 18.97% | 19.34% |

Based on the results of Table 9 it can be concluded that the catalytic activity of the samples containing V (Examples 16 and 17) is similar to its analogue without V and with the same composition (Examples 3 and 6); although in both cases, by adding vanadium to the structure a slight decrease in the Yield to Total Organics is observed, due mainly to the decrease in the production of compounds in the C9-C10+ range.

Example 27. Comparative Catalytic Activity of Catalysts Based on W—Nb (Examples 3 and 6) and W—Nb—Ce—O with the Addition of Ce as a Third Metallic Element (Example 18)

3,000 mg of model aqueous mixture and 150 mg of one of the catalytic materials of Examples 3, 6 and 18 were introduced in the previously described autoclave reactor. The reactor was hermetically sealed, initially pressurized with 13 bar of $N_2$, and heated to 220° C. under continuous stirring. Liquid samples were taken (≈50-100 μl) at different time intervals up to 7 hours of reaction. The samples were filtered and diluted in a standard solution of 2 wt % chlorobenzene in methanol and analysed by means of gas chromatography in a GC-Bruker 430 equipped with a FID detector and a TRB-624 capillary column of 60 m. The identification of the products was carried out using an Agilent 6890N gas chromatograph coupled to an Agilent 5973N (GC-MS) mass detector and equipped with a HP-5MS 30 m capillary column.

The following results were obtained:

TABLE 10

Comparative catalytic activity of the catalysts based on W and Nb of Examples 3 and 6 in the conversion of oxygenated compounds contained in a model aqueous mixture compared to a conventional W—Nb—Ce—O catalyst (Example 18).

|  |  | Example |  |  |
|---|---|---|---|---|
|  |  | 3 | 18 | 6 |
|  |  | Catalyst |  |  |
|  |  | W—Nb—O (1.8) | W—Nb—Ce—O | W—Nb—O (0.7) |
| Conversion (%) | Acetic acid | 8.04% | 13.77% | 9.76% |
|  | Propionaldehyde | 86.31% | 85.05% | 89.02% |
|  | Ethanol | 47.11% | 47.85% | 51.30% |
|  | Hydroxyacetone | 100.00% | 100.00% | 100.00% |
| Final Yield (%) | Acetone | 0.06% | 0.03% | 0.42% |
|  | Ethyl acetate | 7.08% | 6.32% | 5.75% |
|  | 3-pentanone | 0.18% | 0.15% | 0.18% |
|  | 2-methyl-2-pentenal | 8.81% | 10.59% | 10.67% |
|  | C5-C8 | 3.92% | 1.85% | 3.31% |
|  | C9-C10+ | 4.81% | 7.22% | 5.12% |
|  | Total Organics | 17.77% | 19.83% | 19.34% |

From the results of Table 10 it can be inferred that the partial substitution of W by Ce atoms in W—Nb—O materials (maintaining a constant composition ratio), favours the obtainment of similar catalytic activities. It should be noted that the presence of Ce, in these conditions, favours the consecutive condensation reactions and decreases the number of intermediates situated in the C5-C8 product range, while the amount of products generated in the C9-C10+ range increases.

Example 28. Comparative Catalytic Activity of Catalysts Based on W—Nb (Examples 3 and 6) and W—Zr—O (Example 19)

3,000 mg of model aqueous mixture and 150 mg of one of the catalytic materials of Examples 3, 6 and 19 were introduced in the previously described autoclave reactor. The reactor was hermetically sealed, initially pressurized with 13 bar of $N_2$, and heated to 220° C. under continuous stirring. Liquid samples were taken (≈50-100 μl) at different time intervals up to 7 hours of reaction. The samples were filtered and diluted in a standard solution of 2 wt % chlorobenzene in methanol and analysed by means of gas chromatography in a GC-Bruker 430 equipped with a FID detector and a TRB-624 capillary column of 60 m. The identification of the products was carried out using an Agilent 6890N gas chromatograph coupled to an Agilent 5973N (GC-MS) mass detector and equipped with a HP-5MS 30 m capillary column.

The following results were obtained:

TABLE 11

Comparative catalytic activity of catalysts based on W and Nb of Examples 3 and 6 in the conversion of oxygenated compounds contained in a model aqueous mixture compared to a W—Zr—O catalyst (Example 19).

|  |  | Example |  |  |
|---|---|---|---|---|
|  |  | 3 | 19 | 6 |
|  |  | Catalyst |  |  |
|  |  | W—Nb—O (1.8) | W—Zr—O | W—Nb—O (0.7) |
| Conversion (%) | Acetic acid | 8.04% | 1.06% | 9.76% |
|  | Propionaldehyde | 86.31% | 89.82% | 89.02% |
|  | Ethanol | 47.11% | 44.98% | 51.30% |
|  | Hydroxyacetone | 100.00% | 100.00% | 100.00% |
| Final Yield (%) | Acetone | 0.06% | 0.05% | 0.42% |
|  | Ethyl acetate | 7.08% | 7.43% | 5.75% |
|  | 3-pentanone | 0.18% | 0.22% | 0.18% |
|  | 2-methyl-2-pentenal | 8.81% | 10.65% | 10.67% |
|  | C5-C8 | 3.92% | 3.30% | 3.31% |
|  | C9-C10+ | 4.81% | 4.88% | 5.12% |
|  | Total Organics | 17.77% | 19.09% | 19.34% |

From the results of Table 11, it can be inferred that the substitution of Nb for Zr in the W-Metal-O materials leads to results in terms of the formation of products and catalytic activities very similar in general to those observed with W—Nb—O catalysts (Examples 3 and 6). It should be noted that the W—Zr combination of the catalyst of Example 19, under these conditions, significantly reduces the conversion of acetic acid, while the amount of products generated in the C5-C8 and C9-C10+ range are similar to those obtained with the W—Nb—O materials (Examples 3 and 6).

The invention claimed is:

1. A method for producing mixtures of hydrocarbons and aromatic compounds, characterised in that it comprises, at least, the following stages:
   (a) bringing an aqueous mixture containing oxygenated compounds derived from primary biomass treatments in contact with a catalyst, comprising at least W and Nb and that, in its calcined form, is ordered along one of the crystallographic axes and an X-ray diffractogram wherein at least diffraction lines corresponding to angles 2θ to 22.7±0.4 and 46.6±0.4 are observed, wherein the contact between the aqueous mixture containing oxygenated compounds and the catalyst is carried out in a nitrogen, argon, air, nitrogen-enriched air or argon-enriched air atmosphere, or combinations thereof;

(b) reacting the mixture with the catalyst in a catalytic reactor at temperatures between 50° C. and 450° C. and pressures of 1 to 120 bar; and (c) recovering the products obtained in stage (b) by means of a liquid/liquid separation process of the aqueous and organic phases wherein the catalyst has the empirical formula:

$$W_a Nb_b A_c B_d O_e$$

wherein:
A is a metal of the group of alkaline and alkaline earth metals,
B is a chemical element of the group of transition metals, rare earth or elements of groups III, IV and V,
a and b are up to 12,
c is comprised between 0 and 2.0,
d is comprised between 0 and 4.0, and
e has a value depending on the state of oxidation of the elements W, Nb and the element B.

2. The method, according to claim 1, characterised in that d is zero and the catalyst has the empirical formula:

$$W_a Nb_b A_c O_e$$

wherein:
A is a metal of the group of alkaline or alkaline earth metals
a and b are up to 12,
c is comprised between 0.0001 and 1.0 and
e has a value depending on the state of oxidation of the elements W, Nb and A.

3. The method, according to claim 1, characterised in that c is zero and the catalyst has the empirical formula:

$$W_a Nb_b B_d O_e$$

wherein:
B is a chemical element of the group of transition metals, rare earth or elements of groups III, IV and V
a and b are 12,
d is comprised between 0.0001 and 4.0, and
e has a value depending on the state of oxidation of the elements W, Nb and the element B.

4. The method, according to claim 1, characterised in that c and d are zero and the catalyst has the empirical formula:

$$W_a Nb_b O_e$$

wherein:
a and b are up to 12,
e has a value depending on the state of oxidation of the elements W and Nb.

5. The method, according to claim 1, characterised in that A is at least one alkaline metal or alkaline earth metal selected from Li, Na, K, Cs, Be, Mg, Ca, Sr, Ba, and combinations thereof.

6. The method, according to claim 4, characterised in that the metal is selected from Na, K, Cs, Mg, Ca and combinations thereof.

7. The method, according to claim 1, characterised in that the element B is selected from the group of transition metals, rare earth, or elements of group III, IV and V.

8. The method, according to claim 6, characterised in that the element B is a transition metal selected from Ti, V, Cr, Mn, Fe, Co, Ni, Cu, Zn, Zr, Mo, Ta, Tl, Re and combinations thereof.

9. The method, according to claim 6, characterised in that the element B is a rare earth selected from La, Ce and combinations thereof.

10. The method, according to claim 6, characterised in that the element B is an element of group III, IV and V selected from B, Al, Ga, Si, Sn, Sb, and combinations thereof.

11. The method, according to claim 6, characterised in that the element B is selected from Ti, V, Mn, Cu, Zn, Zr, La, Ce, Al, Si, and combinations thereof.

12. The method, according to claim 1, characterised in that mixtures of hydrocarbons and aromatic compounds containing between 5 and 16 carbon atoms are obtained.

13. The method, according to claim 11, characterised in that the products obtained are selected from linear, branched, cyclical aliphatic hydrocarbons containing between 5 and 16 carbon atoms, containing between 0 and 4 oxygen atoms.

14. The method, according to claim 11, characterised in that the products obtained are aromatic compounds containing between 5 and 16 carbon atoms, containing between 0 and 4 oxygen atoms.

15. The method, according to claim 1, characterised in that the aqueous mixture derived from biomass contains oxygenated compounds containing between 1 and 12 carbon atoms, and also contain between 1 and 9 oxygen atoms.

16. The method, according to claim 1, characterised in that the total concentration of the oxygenated compounds contained in the aqueous mixture derived from biomass is in the range comprised between 0.5% and 99.5% by weight.

17. The method, according to claim 15, characterised in that the total concentration of the oxygenated compounds contained in the aqueous mixture derived from biomass is in the range comprised between 1.0% and 70.0% by weight.

18. The method, according to claim 1, characterised in that the contact between the aqueous mixture and the catalyst is carried out in a reactor selected from a discontinuous reactor, a continuous stirred-tank reactor, a continuous fixed-bed reactor and a continuous fluidised-bed reactor.

19. The method, according to claim 17, characterised in that the reactor is a discontinuous reactor and the reaction is carried out in the liquid phase.

20. The method, according to claim 18, characterised in that the process is carried out at a pressure of 1 to 120 bar.

21. The method, according to claim 18, characterised in that the process is carried out at a temperature comprised between 50° C. and 350° C.

22. The method, according to claim 18, characterised in that the contact between the aqueous mixture containing the oxygenated compounds derived from biomass and the catalyst is carried out in a time interval ranging between 2 minutes and 200 hours.

23. The method, according to claim 18, characterised in that the weight ratio between the aqueous mixture containing the oxygenated compounds derived from biomass and the catalyst ranges between 1 and 200.

24. The method, according to claim 17, characterised in that the reactor is a fixed-bed reactor or a fluidised-bed reactor.

25. The method, according to claim 23, characterised in that the reaction temperature is comprised between 50° C. and 450° C.; the contact time is comprised between 0.001 and 200 s; and the working pressure is between 1 and 100 bar.

26. The method, according to claim 1, characterised in that it is carried out in a nitrogen atmosphere.

* * * * *